United States Patent
Hayama et al.

(10) Patent No.: US 11,107,019 B2
(45) Date of Patent: Aug. 31, 2021

(54) ARRANGING A TRANSPORT SERVICE FOR MULTIPLE USERS

(71) Applicant: Uber Technologies, Inc., San Francisco, CA (US)

(72) Inventors: Hiroki Hayama, Castro Valley, CA (US); Kevin Novak, San Francisco, CA (US); Jonathan Hester, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 1069 days.

(21) Appl. No.: 14/814,338

(22) Filed: Jul. 30, 2015

(65) Prior Publication Data

US 2016/0034845 A1 Feb. 4, 2016

Related U.S. Application Data

(60) Provisional application No. 61/999,622, filed on Jul. 30, 2014.

(51) Int. Cl.
*G06Q 10/06* (2012.01)
*G06Q 50/30* (2012.01)
(Continued)

(52) U.S. Cl.
CPC ..... *G06Q 10/063114* (2013.01); *G06Q 10/02* (2013.01); *G06Q 30/0633* (2013.01); *G06Q 50/30* (2013.01)

(58) Field of Classification Search
CPC ................. G06Q 50/30; G06Q 10/02; G06Q 10/063114; G01C 21/3438
(Continued)

(56) References Cited

U.S. PATENT DOCUMENTS

| | | |
|---|---|---|
| 5,168,451 A | 12/1992 | Bolger |
| 5,604,676 A | 2/1997 | Penzias |

(Continued)

FOREIGN PATENT DOCUMENTS

| | | |
|---|---|---|
| CA | 2889853 | 5/2014 |
| JP | 2002-133592 | 5/2002 |

(Continued)

OTHER PUBLICATIONS

International Search report in PCT/US2016/016858 dated May 19, 2016.

(Continued)

*Primary Examiner* — Johnna R Loftis
(74) *Attorney, Agent, or Firm* — Mahamedi IP Law LLP

(57) ABSTRACT

A system can arrange a transport service for a rider. The system can receive, from a first computing device of a first rider, a request for a transport service. The request can include a first pickup location and a first destination location. Based on the first pickup location and the first destination location, the system can determine a plurality of candidate drivers that are each currently assigned to provide a transport service for a respective rider. The system can perform a selection process to select a driver from the plurality of candidate drivers by, for each candidate driver, determining a set of possible travel sequences in which that candidate driver can provide both the transport service for the respective rider and the transport service for the first rider and computing a score for each possible travel sequence.

20 Claims, 11 Drawing Sheets

(51) Int. Cl.
*G06Q 30/06* (2012.01)
*G06Q 10/02* (2012.01)

(58) Field of Classification Search
USPC .................................................. 705/7.15, 6
See application file for complete search history.

(56) References Cited

U.S. PATENT DOCUMENTS

| | | | |
|---|---|---|---|
| 5,945,919 | A | 8/1999 | Trask |
| 6,212,393 | B1 | 4/2001 | Suarez |
| 6,356,838 | B1 | 3/2002 | Paul |
| 6,618,593 | B1 | 9/2003 | Drutman |
| 6,756,913 | B1 | 6/2004 | Ayed |
| 6,925,381 | B2 | 8/2005 | Adamczyk |
| 6,950,745 | B2 | 9/2005 | Agnew |
| 6,989,765 | B2 | 1/2006 | Gueziec |
| 7,062,376 | B2 | 6/2006 | Oesterling |
| 7,080,019 | B1 | 7/2006 | Hurzeler |
| 7,610,145 | B2 | 10/2009 | Kantarjiev |
| 7,822,426 | B1 | 10/2010 | Wuersch |
| 7,840,427 | B2* | 11/2010 | O'Sullivan ............ G06Q 10/02 |
| | | | 705/6 |
| 8,140,256 | B1* | 3/2012 | dos-Santos .......... G06Q 50/188 |
| | | | 701/532 |
| 8,285,571 | B2 | 10/2012 | Demirdjian |
| 8,362,894 | B2 | 1/2013 | Shah |
| 8,554,608 | B1 | 10/2013 | O'Connor |
| 8,799,038 | B2* | 8/2014 | Chen ...................... G06Q 10/06 |
| | | | 705/5 |
| 9,483,744 | B2 | 11/2016 | Ford |
| 9,488,484 | B2 | 11/2016 | Ford |
| 9,552,559 | B2 | 1/2017 | Ford |
| 9,558,469 | B2 | 1/2017 | Ford |
| 9,569,740 | B2 | 2/2017 | Ford |
| 9,599,481 | B2 | 3/2017 | Ford |
| 9,671,239 | B2 | 6/2017 | Ford |
| 9,689,694 | B2 | 6/2017 | Ford |
| 9,715,667 | B2 | 7/2017 | Ford |
| 2001/0037174 | A1 | 11/2001 | Dickerson |
| 2001/0056363 | A1 | 12/2001 | Gantz |
| 2003/0030666 | A1 | 2/2003 | Najmi |
| 2004/0024789 | A1 | 2/2004 | Ditcharo et al. |
| 2004/0049424 | A1 | 3/2004 | Murray |
| 2004/0107110 | A1 | 6/2004 | Gottlieb et al. |
| 2005/0153707 | A1 | 7/2005 | Ledyard |
| 2006/0004590 | A1 | 1/2006 | Khoo |
| 2006/0034201 | A1 | 2/2006 | Umeda et al. |
| 2006/0059023 | A1 | 3/2006 | Mashinsky |
| 2006/0200306 | A1 | 9/2006 | Adamcyzk |
| 2006/0224437 | A1 | 10/2006 | Gupta |
| 2006/0242154 | A1 | 10/2006 | Rawat |
| 2007/0150375 | A1 | 6/2007 | Yang |
| 2007/0255627 | A1 | 11/2007 | Hallowell |
| 2007/0276595 | A1 | 11/2007 | Lewinson |
| 2008/0055049 | A1 | 3/2008 | Weill |
| 2008/0091342 | A1 | 4/2008 | Assael |
| 2008/0195428 | A1 | 8/2008 | O'Sullivan |
| 2008/0270204 | A1 | 10/2008 | Poykko |
| 2008/0277183 | A1 | 11/2008 | Huang |
| 2009/0143965 | A1 | 6/2009 | Chang et al. |
| 2009/0176508 | A1 | 7/2009 | Lubeck et al. |
| 2009/0192851 | A1 | 7/2009 | Bishop |
| 2009/0216600 | A1 | 8/2009 | Hill |
| 2009/0281844 | A1 | 11/2009 | Probst |
| 2009/0313077 | A1 | 12/2009 | Wheeler, IV |
| 2010/0042549 | A1 | 2/2010 | Adamczyk |
| 2010/0205017 | A1 | 8/2010 | Sichelman et al. |
| 2010/0207812 | A1* | 8/2010 | Demirdjian ............ G06Q 30/08 |
| | | | 705/1.1 |
| 2010/0292914 | A1 | 11/2010 | Vepsalainen |
| 2011/0000747 | A1 | 1/2011 | Wu |
| 2011/0009098 | A1 | 1/2011 | Kong |
| 2011/0099040 | A1 | 4/2011 | Felt et al. |
| 2011/0118981 | A1 | 5/2011 | Chamlou |
| 2011/0145089 | A1* | 6/2011 | Khunger ............ G01C 21/3438 |
| | | | 705/26.4 |
| 2011/0153629 | A1 | 6/2011 | Lehmann et al. |
| 2011/0225269 | A1 | 9/2011 | Yap et al. |
| 2011/0301985 | A1 | 12/2011 | Camp et al. |
| 2011/0301997 | A1 | 12/2011 | Gale et al. |
| 2011/0320230 | A1 | 12/2011 | Podgumy |
| 2012/0041675 | A1* | 2/2012 | Juliver ................... G06Q 10/08 |
| | | | 701/465 |
| 2012/0059693 | A1 | 3/2012 | Colodny et al. |
| 2012/0078672 | A1 | 3/2012 | Mohebbi |
| 2012/0131170 | A1 | 5/2012 | Spat |
| 2012/0203599 | A1 | 8/2012 | Choi |
| 2012/0232943 | A1 | 9/2012 | Myr |
| 2013/0024249 | A1* | 1/2013 | Zohar ................... G06Q 10/06 |
| | | | 705/13 |
| 2013/0054139 | A1 | 2/2013 | Bodin |
| 2013/0054281 | A1* | 2/2013 | Thakkar ................ G06Q 50/30 |
| | | | 705/5 |
| 2013/0073327 | A1 | 3/2013 | Edelberg |
| 2013/0090963 | A1 | 4/2013 | Sharma |
| 2013/0102333 | A1 | 4/2013 | Dam |
| 2013/0132140 | A1 | 5/2013 | Amin |
| 2013/0144831 | A1 | 6/2013 | Atlas |
| 2013/0179205 | A1 | 7/2013 | Slinin |
| 2013/0179215 | A1 | 7/2013 | Slinin |
| 2013/0295963 | A1 | 11/2013 | Sen |
| 2014/0011522 | A1 | 1/2014 | Lin |
| 2014/0051465 | A1 | 2/2014 | Ruys et al. |
| 2014/0067488 | A1 | 3/2014 | James |
| 2014/0082069 | A1 | 3/2014 | Varoglu et al. |
| 2014/0129135 | A1 | 5/2014 | Holden et al. |
| 2014/0129951 | A1 | 5/2014 | Amin et al. |
| 2014/0156556 | A1 | 6/2014 | Lavian |
| 2014/0172727 | A1* | 6/2014 | Abhyanker ........ G06Q 30/0645 |
| | | | 705/307 |
| 2015/0324945 | A1 | 1/2015 | Ford |
| 2015/0046080 | A1 | 2/2015 | Wesselius |
| 2015/0154810 | A1 | 6/2015 | Tew |
| 2015/0161554 | A1 | 6/2015 | Sweeney |
| 2015/0161564 | A1 | 6/2015 | Sweeney |
| 2015/0161752 | A1 | 6/2015 | Barreto |
| 2015/0204684 | A1* | 7/2015 | Rostamian ......... G01C 21/3438 |
| | | | 701/537 |
| 2015/0248689 | A1* | 9/2015 | Paul ................... G06Q 30/0222 |
| | | | 705/14.23 |
| 2015/0279217 | A1 | 10/2015 | Chen |
| 2015/0323327 | A1 | 11/2015 | Ford |
| 2015/0323329 | A1 | 11/2015 | Ford |
| 2015/0323330 | A1 | 11/2015 | Ford |
| 2015/0323331 | A1 | 11/2015 | Ford |
| 2015/0323335 | A1 | 11/2015 | Lord |
| 2015/0323336 | A1 | 11/2015 | Lord |
| 2015/0324334 | A1 | 11/2015 | Ford |
| 2015/0324717 | A1 | 11/2015 | Lord |
| 2015/0324718 | A1 | 11/2015 | Lord |
| 2015/0324729 | A1 | 11/2015 | Lord |
| 2015/0324734 | A1 | 11/2015 | Ford |
| 2015/0325158 | A1 | 11/2015 | Ford |
| 2015/0339923 | A1 | 11/2015 | Konig |
| 2015/0345951 | A1 | 12/2015 | Dutta |
| 2015/0356803 | A1 | 12/2015 | Ellis |
| 2016/0019728 | A1 | 1/2016 | Petrie |
| 2016/0026935 | A1 | 1/2016 | Botea |
| 2016/0027306 | A1 | 1/2016 | Lambert |
| 2016/0034828 | A1 | 2/2016 | Sarawgi |
| 2016/0117610 | A1 | 4/2016 | Ikeda |
| 2016/0132792 | A1* | 5/2016 | Rosnow .................. G06F 3/0484 |
| | | | 705/5 |
| 2016/0138928 | A1 | 5/2016 | Guo |
| 2016/0180346 | A1 | 6/2016 | Cheng |
| 2016/0300318 | A1 | 10/2016 | Godil |
| 2016/0334232 | A1 | 11/2016 | Zhuang |
| 2016/0364678 | A1* | 12/2016 | Cao ........................ G06Q 50/30 |
| 2016/0364824 | A1 | 12/2016 | Bryant |
| 2017/0011324 | A1 | 1/2017 | Truong |
| 2017/0138749 | A1 | 5/2017 | Pan |
| 2017/0186126 | A1 | 6/2017 | Marco |

(56) References Cited

U.S. PATENT DOCUMENTS

| | | | |
|---|---|---|---|
| 2017/0193404 | A1 | 7/2017 | Yoo |
| 2017/0300848 | A1 | 10/2017 | Shoval |
| 2017/0308824 | A1 | 10/2017 | Lord |
| 2018/0003843 | A1 | 1/2018 | Hori et al. |
| 2018/0091603 | A1 | 3/2018 | Nickels |
| 2018/0101925 | A1 | 4/2018 | Brinig |
| 2018/0102017 | A1 | 4/2018 | Brinig |
| 2018/0180426 | A1 | 6/2018 | Pan |
| 2018/0268329 | A1 | 9/2018 | Lord |
| 2019/0035202 | A1 | 1/2019 | Brinig |
| 2019/0095849 | A1 | 3/2019 | Sweeney |
| 2019/0109910 | A1 | 4/2019 | Sweeney |
| 2019/0221069 | A1 | 7/2019 | Brinig |
| 2019/0272486 | A1 | 9/2019 | Lord |
| 2020/0173979 | A1 | 6/2020 | Nickels |

FOREIGN PATENT DOCUMENTS

| | | |
|---|---|---|
| JP | 2004-302941 | 10/2004 |
| JP | 2004-362271 | 12/2004 |
| JP | 2005-107942 | 4/2005 |
| JP | 2006-339810 | 12/2006 |
| JP | 3934985 | 6/2007 |
| JP | 2014-130552 | 6/2014 |
| JP | 2014-238831 | 12/2014 |
| JP | 2004-073639 | 5/2015 |
| KR | 10-2010-0053717 | 5/2010 |
| KR | 10-2014-0124137 | 10/2014 |
| KR | 10-2015-0045962 | 4/2015 |
| WO | WO 1999/044186 | 2/1999 |
| WO | WO1999044186 | 9/1999 |
| WO | WO 2005/013588 | 2/2005 |
| WO | WO 2011067741 | 6/2011 |
| WO | WO 2011069170 | 6/2011 |
| WO | WO2014106617 | 7/2014 |

OTHER PUBLICATIONS

IPRP in PCT/US2014/069602 dated Jun. 14, 2016.
Alfred Round, et al.: Future Ride: Adapting New Technologies to Paratransit in the United States, UC Transportation Center Berkeley, CA, UCTC No. 306 (1996).
Kikuchi, et al., "Advanced Traveler Aid Systems for Public Transportation", US Department of Transportation, Sep. 1994.
Fu, et al., "On-Line and Off-Line Routing and Scheduling of Dial-a-Ride Paratransit Vehicles", Computer-Aided Civil and Infrastructure Engineering 14 (1999).
Andersson, Magnus, Peer-to-Peer Service Sharing Platforms: Driving Share and Share Alike on a Mass-Scale, Thirty Fourth International Conference on Information Systems, Milan 2013, pp. 1-15 (2013).
Extended Search Report issued in EP 14869805.3 dated May 10, 2017.
Hai Yang et al. "Equilibria of bilateral taxi-customer searching and meeting on networks", Transportation Research Part B., 2010, vol. 44, pp. 1067-1083.
ISR in corresponding/related PCT/US2015/034831 dated Sep. 24, 2015.
Robert Kuhlthau and Ira D. Jacobson, The Development of a Model for Predicting Passenger Acceptance of Short Haul Air Transportation Systems, NASA, Sep. 1977.
Xing Wang, Optimizing Ride Matches for Dynamic Ride Sharing Systems, GIT, May 2013.
International Search Report issued in PCT/US2017/053065 dated Dec. 13, 2017.
International Search Report and Written Opinion issued in PCTUS2016/062344 dated Jan. 31, 2017.
Extended Search Report issued in EP 15826507.1 dated Nov. 10, 2017.
International Search Report in PCT/US2017/053065 dated Sep. 22, 2017.
Written Opinion issued in SG 11201700669R dated Dec. 5, 2017.
International Search Report in PCT/US2015/043654 dated Nov. 26, 2015.
First Examination Report in EP 14869806.3 dated May 4, 2018.
Aloizio P. Silva, A Mobile Location-Based Vehicle Fleet Management Service Application, 0-7803-78482/03 2003, IEEE.
First Office Action in CN 2014800731753 dated Feb. 3, 2019.
Examination Reported in AU 2017342747 dated Apr. 8, 2019.
Office Action in EP 15826501.7 dated May 14, 2019.
Exam Report No. 2 in AU 2017/342747 dated Aug. 27, 2019.
Second Office Action in CN 2014800731753 dated Sep. 27, 2019.
EESR in EP 17859424.8 dated Aug. 5, 2019.
ISR and Written Opinion in PCT/US2018/055256 dated Jan. 30, 2019.
How to request multiple Uber vehicles, Aug. 15, 2013 (https://www.wikihow.com/ Request-Multiple-Uber-Vehicles.
How to book two cabs at the same time in Uber, Jun. 30, 2017 (https://fastandclean.org/ book-two-cabs-time-uber).
Is it possible to order 2 Ubers at the same time, Jul. 13, 2015 (https://web.archive.org/web/20150801000000*/https://android.Stackexchange.com/questions/114027/is-it- possible-to-order-2-ubers-at-the-same-time.
Written Opinion in PCT/US2018/055256 dated Jul. 19, 2019.
Examination Report No. 1 in AU 2014362392 dated Sep. 10, 2019.
Examination Report No. 1 in AU 2014362378 dated Sep. 18, 2019.
Examination Report No. 1 in AU 2016555549 dated Nov. 16, 2020.
Second Office Action dated Sep. 27, 2019 in CN 2014800731753.
Office Action dated Apr. 16, 2020 in EP 1670690.0.
Exam Report No. 1 in AU 2015296265 dated Apr. 21, 2020.
Office Action in JP 2018-524399 dated Apr. 8, 2020.
Office Action in BR 1120170017768 dated May 6, 2020.
Exam Report No. 2 in AU 2014362378 dated May 7, 2020.
Exam Report No. 2 in AU 2015296265 dated Aug. 13, 2020.
Office Action in BR 1120180097799 dated Aug. 27, 2020.

* cited by examiner

ARRANGING A TRANSPORT SERVICE FOR MULTIPLE USERS

RELATED APPLICATIONS

This application claims the benefit of priority to U.S. Provisional Patent Application No. 61/999,622, filed Jul. 30, 2014, titled ARRANGING A TRANSPORT SERVICE FOR MULTIPLE USERS; the aforementioned application being incorporated by reference in its entirety.

BACKGROUND

Systems exist that can arrange for a transport service to be provided by a driver through the use of computing devices. For example, a user can make a request for a transport service using a mobile computing device and a system can select a driver to perform the transport service for the user.

DETAILED DESCRIPTION

Figure 1:
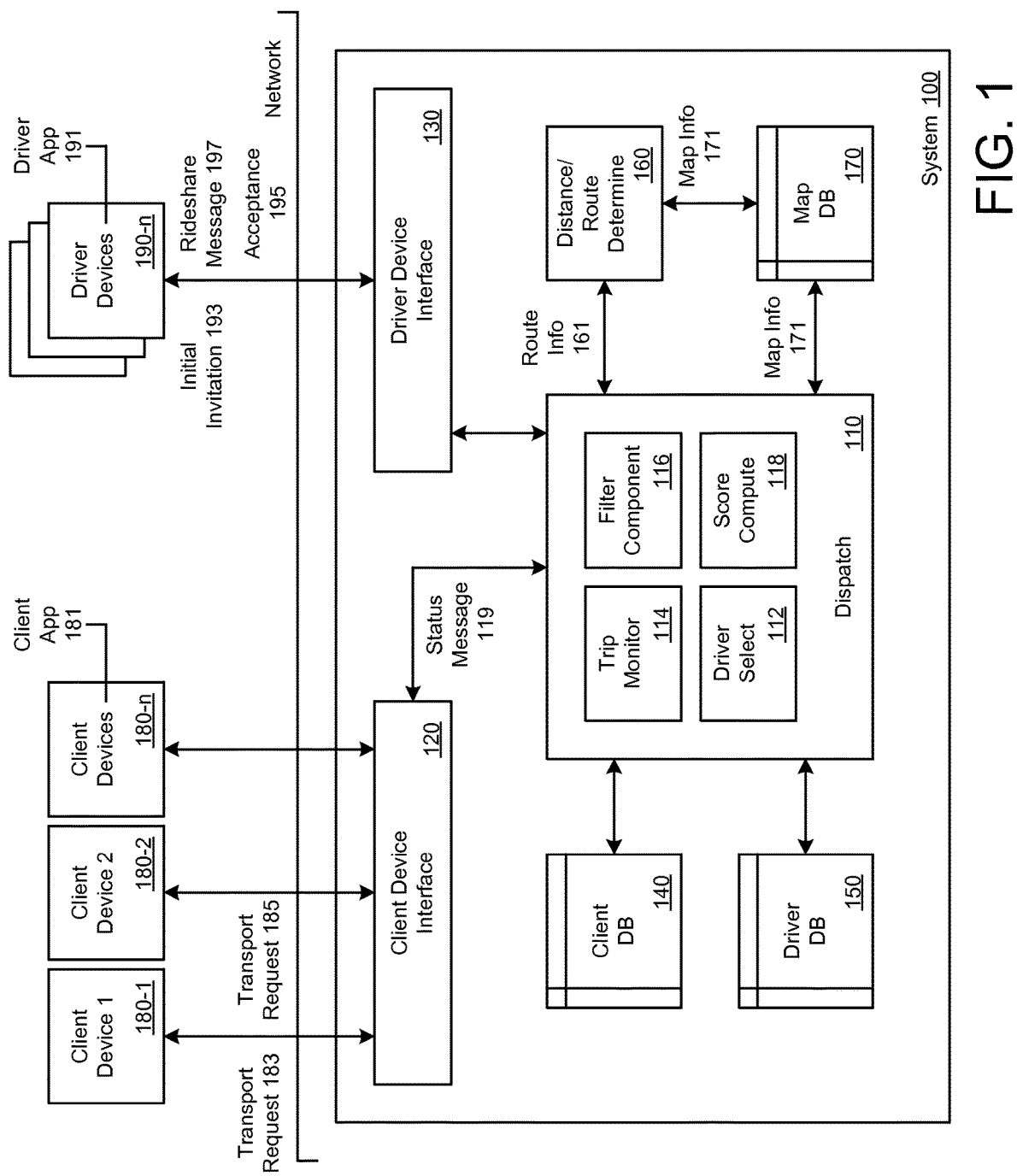
FIG. 1 illustrates an example system to arrange a transport service for multiple users, under an embodiment.

Examples described herein provide for a transport arrangement system to arrange a transport service to be provided for multiple users by a single driver. In examples described, the transport arrangement system (e.g., referred to herein as "the system") provides a network service in which the system can receive requests for transport service from two or more users (also referred to as riders) at different instances of time, and based on information provided by the individual users in the requests, can dynamically assign a driver to provide transport to the two or more users so that the users share at least a portion of the transport service (e.g., rideshare).

Depending on implementation, the system can perform various computational operations to determine whether a transport service should be at least partially shared by two or more users. According to an example, the system can arrange a transport service to be provided by a driver for a first user. Subsequently, the system can receive a request for transport service from a second user's device. The system can determine whether the driver is to be selected to provide transport service for the second user as part of the transport service for the first user. In some examples, the system can make this determination based, at least in part, on a first pickup location of the first user, a second pickup location of the second user, a first destination location of the first user, and a second destination location of the second user. If the system determines that the driver is to be selected to provide transport service for the second user, the system can transmit a notification message to the driver's device indicating that the driver is to provide transport service for the second user as part of the transport service for the first user.

The system can determine whether the driver is to be selected to provide transport service for the second user by determining scores for possible travel sequences or orders for that driver. In one implementation, the system can determine the scores (e.g., distance scores) by performing a plurality of distance computations based on a first pickup location of the first user, a second pickup location of the second user, a first destination location of the first user, and a second destination location of the second user. Such location information can be provided by the first user and the second user via the respective computing devices at different instances of time.

The system can use the computed scores to determine if the second user satisfies one or more conditions. For example, the satisfaction of a first condition can represent that pairing the first and second users together for ridesharing may be preferable (or efficient), e.g., as the total distance traveled by the driver would be less than (or less than or equal to) the sum of the distances of the respective transport services if traveled separately. In another example, the first condition can use the computed distance information and compare it to another ratio or threshold, as opposed to a ratio of one. If the second user satisfies the first condition, the system can determine if the second user satisfies a second condition. In one example, the satisfaction of the second condition can represent that pairing the first and second users together for ridesharing would not severely inconvenience the first and second users.

In another example, when a request for a transport service is received from a first user, the system can determine a set of candidate drivers (e.g., one or more candidate drivers) for the first user, where each candidate driver is currently assigned to provide a transport service for another respective user. In other words, at the time the request is received from the first user, each candidate driver may have previously been assigned to transport another user. A candidate driver that is assigned to transport another user may be traveling to pick up the respective user or may have already picked up the respective user. The system can perform a selection process to select a driver from the plurality of candidate drivers. In one example, performing the selection process can include, for each candidate driver in the plurality of candidate drivers, determining a set of possible travel sequences in which that candidate driver can provide both the transport service for the respective user and the transport service for the first user. The selection process can also include computing a score for each possible travel sequence in the set of possible travel sequences and selecting a possible travel sequence based on the computed scores. The candidate driver can be selected based on the possible travel sequence.

The system can perform different selection processes depending on implementation. According to one example, the system can determine the set of possible travel sequences for each candidate driver by (i) first determining a plurality of possible travel sequences, (ii) for each of the plurality of possible travel sequences, computing a first distance score for the first user and a second distance score for the respective user currently assigned to that candidate driver, and (iii) identifying the set of possible travel sequences that each have the first distance score and the second distance score that satisfy a first condition. For each of the plurality of possible travel sequences, the first distance score for the first user can be based, at least in part, on a shared distance in which the first user and the respective user would travel together and an individual distance in which the first user would travel without the respective user, and the second distance score for the respective user is based, at least in part, on the shared distance and an individual distance in which the respective user would travel without the first user.

According to another example, the system can determine the set of possible travel sequences for each candidate driver by (i) first determining a plurality of possible travel sequences, (ii) for each of the plurality of possible travel sequences, computing a savings scored based, at least in part, on a first predicted score of the first user in which the first user is transported individually, a second predicted score for the respective user currently assigned to that candidate driver, and a third predicted score in which the first user and the respective user would travel together for at least a duration of time, and determining a savings ratio based on the savings score, and (iii) identifying the set of possible travel sequences that each have the savings ratio that satisfy a first condition.

Among other benefits and technical effect, examples described herein improve efficiency with respect to mobile computing devices that are operated by users and drivers. In particular, examples herein facilitate the pairing of users for a transport service so that the pairing provides efficiency for the individual drivers and for the system as a whole. In a given region or city, hundreds of users can interact with the network service to request transport services in a given duration of time. As a result, thousands of permutations or combinations of user pairings can be possible, particularly for requests in the region when considered as a whole. Examples herein can efficiently and quickly determine which pairing is best for multiple users, thereby reducing the amount of time and/or distance users (and/or the driver) have to travel while potentially maximizing cost savings for the users.

As compared to conventional approaches, some examples as described increase efficiency of driver assignments based on a variety of factors, such as throughput of individual driver or of a group of drivers, wait time of passengers, or collective wait time of passengers in a given time period. Some examples further recognize that the interests of the individual driver and/or passenger may not be aligned with the interest of a service which arranges the transport services. For example, a transport arrangement service may select drivers for riders based on optimization criteria which serves a collective (e.g., total passenger wait time), while the interest of the driver may be to acquire the next ride that is nearby. To accommodate this potential misalignment of interests and better serve, for example, the community of drivers, controls can be implemented in the selection process of drivers for transport requests which minimize the ability of drivers (or riders) to influence the driver assignment decision, thereby preserving the integrity of the objective criteria/selection process in use. Among the controls which can be implemented, location information from drivers is obtained without driver involvement while the driver is on a trip and when the driver is available for service. The driver may be precluded from altering the communication of location information. Moreover, in some variations, the destination locations for (i) drivers on active trips, (ii) drivers progressing to a pickup location, and/or (iii) drivers available for pickup requests, can be determined and matched to numerous incoming requests in order to determine, for example, sequence of pickups for the driver (if any). The matching process can be done dynamically, using information that could not be processed by a vehicle or operator, as the determinations require real-time location information and status information for multiple drivers and potential riders. To further any one objective, the process can be repeated for select drivers, even when a preliminary match may have been made. In this way, the service is able to advance the objective criteria serving the interest of the users rather than the individual drivers or customers.

Still further, while some examples described herein relate to transport services, the system can enable other on-demand location-based services (for example, a food truck service, a delivery service, an entertainment service) to be arranged between users and service providers. For example, a user can request an on-demand service, such as a delivery service (e.g., food delivery service, messenger service, food truck service, or product shipping service) or an entertainment service (e.g., mariachi band, string quartet) using his or her mobile device, and the system can select a service provider, such as a driver, food provider, band, etc., to provide the on-demand service for the user.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system to arrange a transport service for multiple users, under an embodiment. In the example of FIG. 1, a transport arrangement system 100 includes a dispatch 110, a client device interface 120, a driver device interface 130, a client database 140, a driver database 150, a distance/route determine 160, and a map database 170. A plurality of client devices 180 and a plurality of driver devices 190 can communicate with the system 100 over one or more networks using, for example, respective designated service applications 181, 191 that are configured to communicate with the system 100. The components of the system 100 can combine to process location data and to arrange a transport service for a requesting user using location data. Logic can be implemented with various applications (e.g., software) and/or with hardware of a computer system that implements the system 100.

Depending on implementation, one or more components of the system 100 can be implemented on network side resources, such as on one or more servers. The system 100 can also be implemented through other computer systems in alternative architectures (e.g., peer-to-peer networks, etc.). As an addition or an alternative, some or all of the components of the system 100 can be implemented on client devices, such as through applications that operate on the client devices 180 and/or the driver devices 190. For example, a client service application 181 and/or a driver service application 191 can execute to perform one or more of the processes described by the various components of the system 100. The system 100 can communicate over a network, via a network interface (e.g., wirelessly or using a wireline), to communicate with the one or more client devices 180 and the one or more driver devices 190.

The system 100 can communicate, over one or more networks, with client devices 180 and driver devices 190 using a client device interface 120 and a device interface 130, respectively. The device interfaces 120, 130 can each manage communications between the system 100 and the respective computing devices 180, 190. The client devices 180 and the driver devices 190 can individually operate client service applications 181 and driver service applications 191, respectively, that can interface with the device interfaces 120, 130 to communicate with the system 100. According to some examples, these applications can include or use an application programming interface (API), such as an externally facing API, to communicate data with the device interfaces 120, 130. The externally facing API can provide access to the system 100 via secure access channels over the network through any number of methods, such as web-based forms, programmatic access via restful APIs, Simple Object Access Protocol (SOAP), remote procedure call (RPC), scripting access, etc.

As described herein, the system 100 can arrange for a transport service to be provided for a requesting user. In one example, the client application 181 can provide one or more user interface features to be displayed on a client device 180, such as a selection mechanism, which enables a user to select a vehicle type, and other features to enable the user to select a pickup location, and make a transport request via user input. Vehicle types can include classes of vehicles and/or types of drivers or services, such as town cars, vehicles driven by non-commercial drivers, hybrid vehicles, SUVs, limousines, taxis, on-demand ice cream or food, etc. In some examples, the client application 181 can enable a user to request a ridesharing transport service (e.g., a shared transport service), which indicates that the user wants a transport service and is also open to sharing the transport with one or more other users (e.g., as a vehicle type or by selecting a ridesharing feature via user input on a user interface).

Referring back to FIG. 1, the system 100 can receive, via the client device interface 120, a transport request 183 for transport service from a first user operating a first client device 180-1. In this example, the first user has specified in the transport request 183 that she is willing to share the transport with another user. The dispatch 110 can receive the transport request 183, which includes a pickup location of the first user (referred to herein as a "first pickup location"), the current location of the first user if it is different than the first pickup location, the first user's identifier (ID), and/or the ID of the first client device 180-1. For example, the client application 181 operating on the first client device 180-1 can receive (e.g., periodically) the current location of the first client device 180-1 using one or more geo-aware resources (e.g., global positioning system (GPS) receiver). Depending on implementation, the transport request 183 can also include a destination location of the first user (referred to herein as a "first destination location"). If the first user did not specify the first destination location, the system 100 can transmit a message or notification to the first client device 180-1 requesting the first user to input or select the first destination location. The message can indicate that because the user made the transport request 183 and specified the ridesharing option or vehicle type, the user's destination location is necessary.

As an addition or an alternative, the dispatch 110 can access a client database 140 using the user ID to determine if the first user has specified in her profile whether she wants to rideshare or not. For example, the first user can configure a rideshare setting in which the user toggles a "yes" or "no" feature indicating her preference as to share a transport service with another user or not.

According to some examples, the dispatch 110 can include a driver select 112, a trip monitor 114, a filter component 116, and a score compute 118. In one example, when a transport request is received by the system 100, the filter component 116 can access the driver database 150 to determine a set of candidate drivers based on information from the transport request and the driver's current location and/or status. As described herein, candidate drivers are drivers that are capable of providing the transport service for a requesting user (e.g., drivers that are within a predetermined distance and/or an estimated time of arrival threshold from the first pickup location, that satisfy the ridesharing option or vehicle type, that have available space in their vehicle, etc.). For example, for a user that requests a rideshare option, candidate drivers can include drivers that are occupied (e.g., currently assigned to provide a transport service for another user that has requested the rideshare option) and/or drivers that are unoccupied but available to provide transport service (e.g., not yet assigned to provide a transport service but has agreed to be a rideshare driver or vehicle type).

The filter component 116 can determine one or more candidate drivers based on one or more filtering operations.

The score compute 118 can perform one or more computational operations to determine scores associated with the one or more candidate drivers based on one or more user-configured rules or parameters. Based on the determined scores, the driver select 112 can select a driver to provide the transport service for a requesting user. According to some examples, the score compute 118 and the driver select 112 can correspond to or be included as one sub-component of the dispatch 110.

Referring to the example of FIG. 1, when the dispatch 110 receives the transport request 183, the driver select 112 can select a driver from a pool of candidate drivers to provide the transport service for the first user. Because the first user has requested a rideshare vehicle type, in one example, the dispatch 110 can first determine whether any occupied candidate driver exists that can provide the transport service for the first user. If no occupied candidate drivers are suitable matches for the first user, the dispatch 110 can determine whether one or more unoccupied candidate drivers exist to provide the transport service for the first user. The dispatch 110 can then select a driver from the unoccupied candidate drivers.

For purpose of simplicity, in this example, the driver select 112 has determined, e.g., based on data from the score compute 118, that no occupied candidate drivers are suitable to provide the transport service for the first user, and has selected a driver (e.g., an unoccupied candidate driver) to provide the transport service for the first user. The driver select 112 can identify the driver's device 190, and transmit an initial invitation 193 to the driver device 190 via the driver device interface 130. The initial invitation 193 can cause the driver application 191 to display information about the first user and/or the first pickup location, and to enable the driver to accept or reject the transport service via user input.

If the driver accepts the initial invitation 193, the driver device 190 can transmit an acceptance 195 to the dispatch 110 via the driver device interface 130. At this time, the dispatch 110 determines that the transport service (e.g., as referred to herein as a "trip") has been arranged for the first user. The trip monitor 114 can monitor the status of the first user's trip and/or the driver and can provide one or more status messages 119 to the first user's client device 180-1 regarding the trip. For example, when the driver provides the acceptance message 195, the trip monitor 114 can provide, to the first user's client device 180-1, a status message 119 indicating that a driver has been selected, the driver's information, and the estimated time of arrival.

During the time the driver travels from the driver's current location to the first pickup location, the dispatch 110 can continue to receive transport requests from other users. Other users can be in different geographic regions (e.g., a different city, metropolitan area, or state than the first user), can request different vehicle types, and/or can have different preferences. However, in some instances, a second user that is within a specified geographic region or service area (e.g., as defined by a geographical boundary, or geofence as specified by three or more location data points that make up the perimeter of the geofence) can also request a transport service and be willing to share a transport service.

In some examples, while the driver is traveling to the first pickup location (e.g., the driver has been assigned to pick up the first user, but has not yet started the transport service for the first user), the dispatch 110 can receive a transport request 185 from a second user operating a second client device 180-2. For example, the trip monitor 114 can monitor the movement of the driver by receiving location data (e.g., periodically) from the driver's device 190 and determine that the driver has not yet arrived at the first pick up location. In some examples, the driver application 191 operating on the driver's device 190 can receive (e.g., periodically) the current location of the driver's device 190 using one or more geo-aware resources (e.g., GPS receiver) of the driver's device 190. In another example, the trip monitor 114 can assume that the driver has not yet started the transport service for the first user until it receives a status update from the driver device 190 (provided by the driver's user input on the driver application 191) that the transport service has started.

The second user's transport request 185 can indicate the second user's request for a ridesharing option or vehicle type (e.g., the second user is willing to share the transport with another user). The transport request 185 can also include a pickup location of the second user (referred to herein as a "second pickup location"), the current location of the second user if it is different than the second pickup location, the second user's ID, and/or the ID of the second client device 180-2. The transport request 185 can also include a destination location of the second user (referred to herein as a "second destination location"). If the second user did not specify the second destination location, the system 100 can transmit a message or notification to the second client device 180-2 requesting the second user to input or select the second destination location, such as described above.

According to an example, the filter component 116 can perform one or more filtering operations to determine a plurality of candidate occupied drivers for the second user. In one example, the filter component 116 can access the driver database 150 and/or communicate with the trip monitor 114 to determine which drivers are located within a predetermined distance or estimated travel time from the second pickup location, and from those drivers, identify a pool of candidate drivers that allow for ridesharing.

For purposes of simplicity, FIG. 1 is described with the driver for the first user as being the only candidate driver in such a pool. The dispatch 110 can then determine whether this driver is to be selected to provide transport service for the second user. The dispatch 110 can make this determination by performing score computations that are based, at least in part, on the first pickup location, the second pickup location, the first destination location, and the second destination location. For example, for each candidate driver in the pool, the score compute 118 of the dispatch 110 can determine scores associated with that candidate driver based on the first pickup location (or the current location of that candidate driver if the respective user has been picked up), the second pickup location, the first destination location, and the second destination location. Depending on implementation, the determined scores can be based on distances or can be based on a combination of distances and times. For example, computed distances, with respect to determining whether the driver for the first user should be selected to provide transport service for the second user, are illustrated with reference to FIGS. 2A and 2B for purpose of simplicity.

Figure 2A:
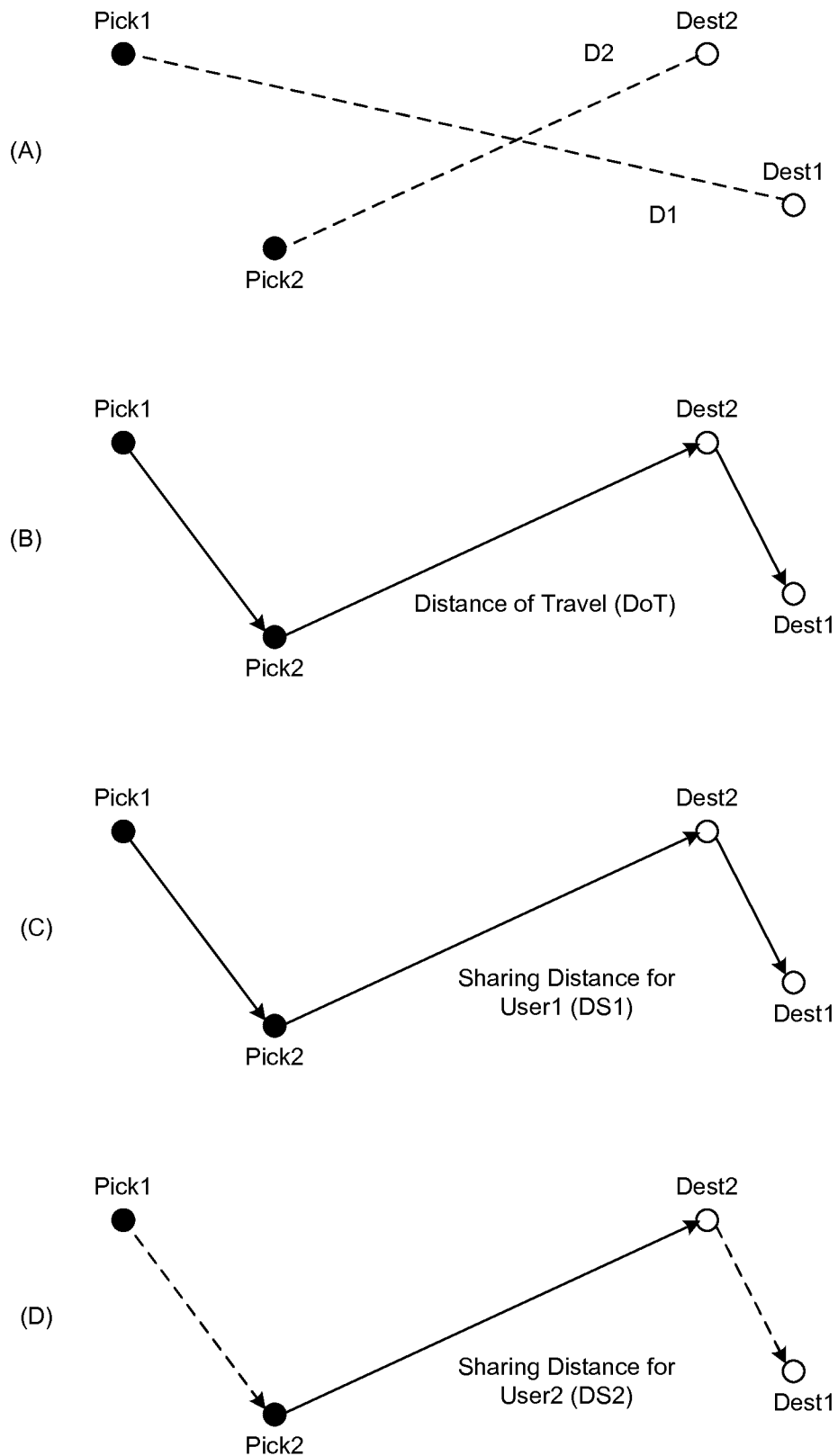
FIGS. 2A and 2B illustrate example diagrams depicting computed distances for arranging a transport service.
Figure 2B:
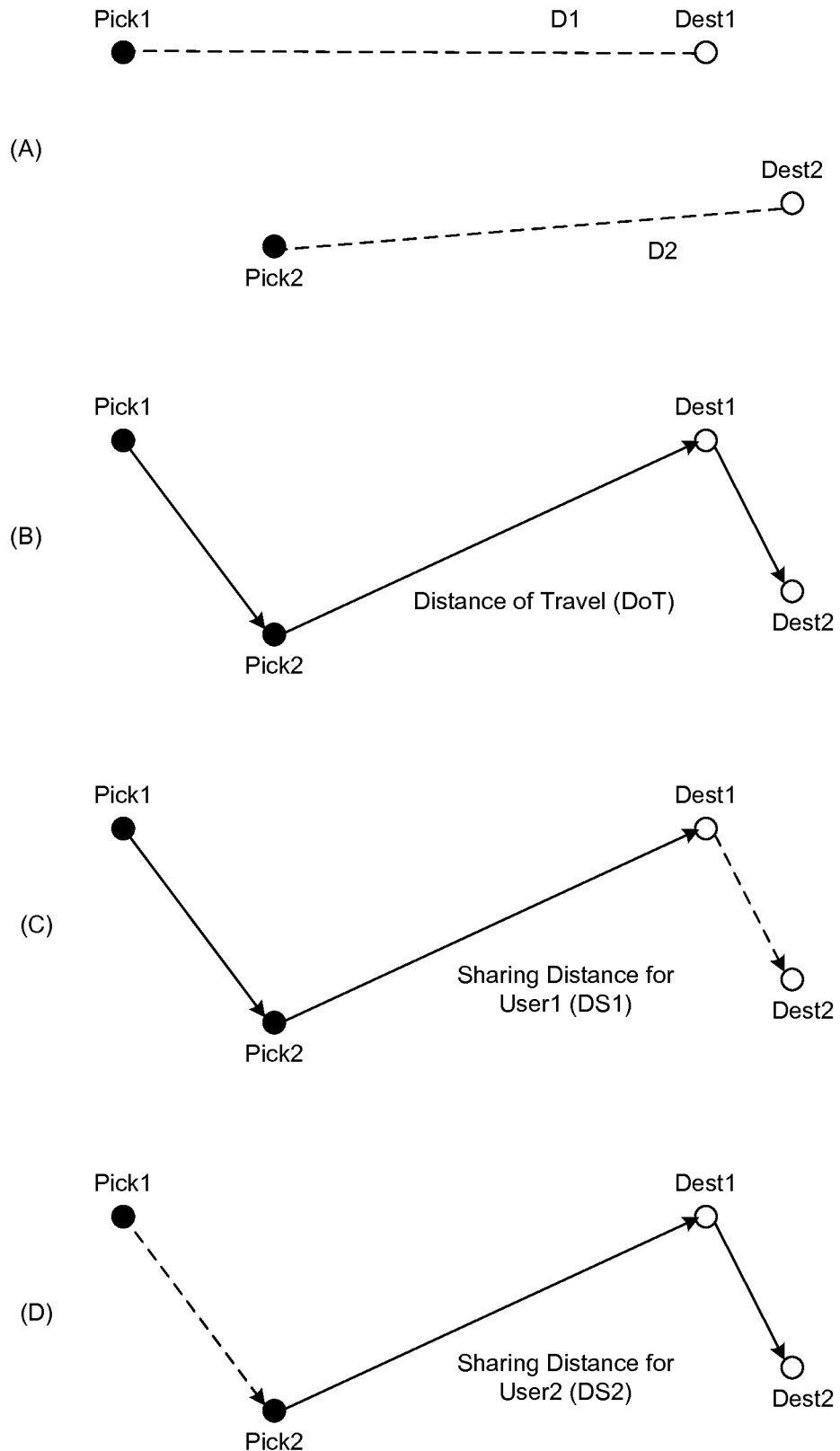

FIGS. 2A and 2B, for example, illustrate four points that represent coordinates (e.g., a latitude and a longitude) associated with the first user and the second user—the first pickup location (Pick1), the second pickup location (Pick2), the first destination location (Dest1), and the second destination location (Dest2). For example, FIG. 2A illustrates a particular possible travel sequence or order if the driver of the first user was to also provide transport service for the second user. While only one possible travel sequence is illustrated in FIG. 2A, a driver may have four possible travel sequences in which the driver can transport the first user and the second user if the driver has not yet picked up the first user when the second user makes the transport request 185, and alternatively, may have two possible travel sequences in which the driver can transport the first user and the second user if the driver has already picked up the first user when the second user makes the transport request 185.

In diagram (A), D1 represents the distance that the first user would travel if the first user were to be provided the transport service individually by a driver, while D2 represents the distance that the second user would travel if the second user were to be provided the transport service individually by another driver. In diagram (B) of FIG. 2A, the Distance of Travel (DoT) represents the total distance of travel of the driver as part of the ridesharing if the second user was to be provided transport service by the driver of the first user as part of providing transport service for the first user. In other words, the DoT can be the distance of travel from the first pickup location (Pick1) to the second pickup location (Pick2) to the second destination location (Dest2) to the first destination location (Dest1).

In diagram (C), the sharing distance for the first user (DS1) is represented as the distance the first user would have to travel as a result of the ridesharing if the second user was to be provided transport service by the driver as part of providing transport service for the first user. Thus, in this example, DS1 would be the distance of travel from the first pickup location to the second pickup location to the second destination location to the first destination location because the first user is being dropped off after the second user in the possible travel sequence or order illustrated in FIG. 2A. In diagram (D), the sharing distance for the second user (DS2) is represented as the distance the second user would have to travel as a result of the ridesharing if the second user was to be provided transport service by the driver as part of providing transport service for the first user. Thus, in this example, DS2 would be the distance of travel from just the second pickup location to the second destination location, as the second user is being dropped off before the first user.

Similarly, FIG. 2B illustrates another example of computed distances for one particular possible travel sequence for the driver, except in this example, in contrast to FIG. 2A, the locations of the first and second destination locations have switched. FIG. 2B illustrates that while DoT can be the same, DS1 and DS2 are different as a result of the different destination locations. Similarly, D1 and D2 are different in FIG. 2B as compared to FIG. 2A.

In addition, in some examples, such as shown in FIGS. 2A and 2B, the distances between points are illustrated by direct point-to-point measurements (e.g., using Cartesian distance measurements or Haversine distance measurements). However, in other examples, the distances (e.g., D1, D2, DoT, DS1, DS2) can be determined using an estimated travel route based on route information 161 provided from the distance/route determine 160. The distance/route determine 160 can use map information 171, for example, from a map database 170 (as well as other information, such as weather conditions, traffic conditions, etc.) in order to determine the distances between the respective locations. Still further, in other examples, the distances can also be represented as estimated times of arrival (ETAs) between respective locations or can be represented as a score (e.g., a weighted score) that is based on both a distance and a time (e.g., elapsed duration or estimated travel time), and the driver select 112 can then determine whether the driver is to be selected to provide transport service for the second user based on the score(s). As described herein, the estimated travel routes can also include tolls for various roadways and bridges (and costs for those tolls or designated scores for those tolls), which the score compute 118 can use for computing scores for possible travel sequences, in one or more examples.

Referring back to FIG. 2A, the distances measured by the score compute 118 are dependent on the order in which the driver travels to the locations. For example, in FIG. 2A, the distances are computed in the following order: Pick1 to Pick2 to Dest2 to Dest1 (e.g., referred to as a first possible travel sequence or order). For these locations provided by the first and second users, the score compute 118 can also compute the distances (D1, D2, DoT, DS1, DS2) in another order: Pick1 to Pick2 to Dest1 to Dest2 (e.g., referred to as a second possible travel sequence or order). These possible travel sequences, in this example, can be based on the assumption that the driver is designated to pick up the first user before picking up the second user. Alternatively, these possible travel sequences can be based on the assumption that the driver has already picked up the first user, in which Pick1 can correspond to the current location or last determined location of the driver when the distance computations are being performed (as opposed to the pickup location of the first user).

The score compute 118 can determine if the second user satisfies a first condition with respect to the first user (or vice versa, can determine if the driver satisfies conditions to be selected to provide the transport service for the second user) by determining, for each possible travel sequence order, whether a distance of travel (DoT) is greater than a total distance or sum of (i) a first distance from the first pickup location to the first destination location (D1), and (ii) a second distance from the second pickup location to the second destination location (D2).

In other words, the score compute 118 can determine, for each order, the "distance cost" or "distance score" for assigning the second user to rideshare with the first user. The distance cost can be represented as a ratio in one example:

$$\text{DoT}/(D1+D2) \tag{Eq. 1}$$

In one example, if the ratio of the distance cost is equal to or greater than one (or simply, greater than one, in some examples) for all orders (e.g., regardless of whether Dest2 or Dest1 would be traveled to first after picking up both the first and second users), the score compute 118 can determine that the second user should not be provided transport by the driver and provide information to the driver select 112 to exclude the driver from selection. If the ratio of the distance cost is less than one (or less than or equal to one, in another example), the score compute 118 can determine which ratio (the ratio of the first order or the ratio of the second order) is smallest, and perform additional computations based on the selected order of travel.

Based on the selected order (e.g., the first possible travel sequence from Pick1 to Pick2 to Dest2 to Dest1 or the second possible travel sequence from Pick1 to Pick2 to Dest1 to Dest2), the score compute 118 can determine if the second user satisfies a second condition with respect to the first user. For example, the score compute 118 can determine if any of the first or second users would be severely inconvenienced by the ridesharing (e.g., one or more of the users would have to go far out of the way to pick up or drop off a user). For the specified order, the score compute 118 can determine whether a first user value, which is a ratio of (i) a sharing distance (DS1) in which the first user would travel as a result of sharing the transport service, to (ii) the first distance (D1), is greater than a threshold value. Similarly, the score compute 118 can determine whether a second user value, which is a ratio of (i) a sharing distance (DS2) in which the second user would travel as a result of sharing the transport service, to (ii) the second distance (D2), is greater than the threshold value.

In other words, for example, the score compute 118 can determine, for each user, the "individual passenger cost or score" (or inconvenience cost) for assigning the second user to rideshare with the first user. The individual passenger cost for the first user can be represented as a ratio or first user value:

$$DS1/D1 \qquad \text{(Eq. 2)}$$

while the individual passenger cost for the second user can be represented as a ratio or second user value:

$$DS2/D2 \qquad \text{(Eq. 3)}$$

According to an example, if any of the first user value or the second user value is greater than a threshold (or in another example, greater than or equal to the threshold), such as a value 1.3, 1.5, 1.7, etc., the score compute 118 can determine that one of the users (or both) would be too inconvenienced, and thus, can determine that the second user should not be provided transport by the driver. Such a threshold can be a user-configured and modifiable threshold value. In such an example, the score compute 118 can provide information to the driver select 112 to exclude the driver of the first user from selection, and the driver select 112 can process the second user's transport request 185 in a normal fashion by performing a driver selection process for the second user from a pool of unoccupied candidate drivers (e.g., as previously done for the first user in this example). Once a second driver is selected for the second user, the second user can then be separately included in the pool of arranged transport services that allow for ridesharing.

On the other hand, if both the first user value and the second user value are less than or equal to the threshold (or in the other example, less than the threshold), the score compute 118 can determine that the second user is a good candidate for ridesharing (or in other words, that the first user and driver can be paired with the second user) and can include the driver in as an option for providing the transport service for the second user. In this example, however, because the driver is the only candidate occupied driver, the driver select 112 can select the driver to perform the transport service for the second user as part of the transport service for the first user. The dispatch 110 can then transmit a rideshare message 197 to the driver's device 190 indicating that the driver is to provide transport service for the second user. In addition, the dispatch 110 can provide, to the driver application 191 of the driver's device 190, information about the manner in which to travel to provide transport service to multiple users. The dispatch 110 can instruct (either incrementally or at once) the driver to travel to the pickup and destination locations in the specified order (e.g., the first order of travel from Pick1 to Pick2 to Dest2 to Dest1). The trip monitor 114 can also transmit a status message 119 to the second client device 180-2 indicating that a driver has been selected for the second user.

According to another example, the rideshare message 197 can also be an invitation message that enables the driver to accept or reject the subsequent ridesharing transport service for the second user. If the driver rejects the subsequent transport service for the second user, the driver select 112 can determine if there are other drivers in the pool of arranged transport services that allow for ridesharing and the score compute 118 can perform the aforementioned computations to determine if any drivers satisfy the conditions using location information from other drivers' (and arranged users') transport services.

In addition, referring back to the example when the second user is not to be provided transport by the driver, the second user can be provided transport by another driver (e.g., a second driver), and the second user and the second driver arrangement can be included to the pool of arranged transport services that allow for ridesharing. In this manner, when a third user makes a transport request to the system 100 and has indicated that she would like to share the transport (e.g., and the driver is still traveling to the pickup location of the first user and the second driver is traveling to the pickup location of the second user), the dispatch 110 can perform the aforementioned operations for the third user to determine if the driver or the second driver should provide transport service to the third user as part of the transport service for the first user or the second user, respectively. The dispatch 110 can perform the aforementioned operations for the first user's location information relative to the third user's location information and for the second user's location information relative to the third user's location information.

Still further, in the examples described herein, only two orders (e.g., the first order and the second order) were discussed with respect to determinations made by the driver select 112 and/or the score compute 118. In one example, the dispatch 110 can operate under one or more rules or parameters in which ridesharing is performed under the default instruction that the driver is to pick up the first user first (e.g., because the first user requested first). As such, only two orders were described in FIG. 1, e.g., the first order of travel from Pick1 to Pick2 to Dest2 to Dest1 and the second order of travel from Pick1 to Pick2 to Dest1 to Dest2.

As an addition or an alternative, however, other orders can be possible if the driver, for example, can drive to the second pickup location first before going to the first pickup location. In such an example, there can be four different possible travel sequences or orders: a first order of travel from Pick1 to Pick2 to Dest2 to Dest1, a second order of travel from Pick1 to Pick2 to Dest1 to Dest2, a third order of travel from Pick2 to Pick1 to Dest2 to Dest1, and a fourth order of travel from Pick2 to Pick1 to Dest1 to Dest2. Again, the score compute 118 can compute the various distance measurements (such as described in reference to FIGS. 2A and 2B) for each order. The score compute 118 can determine if transporting the first user and the second user satisfies a first condition with respect to the first user by determining, for each of the four orders, the distance cost or the distance score. If all four distances costs or scores (or ratios of distance cost) do not satisfy the threshold condition or threshold ratio condition, the score compute 118 can determine that the second user should not be provided transport by the driver and can exclude that driver from being selected by the driver select 112.

If, however, one or more of the ratios of the distance cost is less than one (or less than or equal to one, in another example), the score compute 118 can determine which ratio is smallest, and perform additional computations based on the selected order of travel, such as determining if transporting the first user and the second user satisfies a second condition. If there are any ratios of the distance cost that is equal (or substantially equal, e.g., within 90% of each other), such as the first order and the fourth order, the driver select 112 can then perform an additional computation to determine, based on ETA of the driver's current location to the first pickup location or the second pickup location, which of the orders to select (e.g., the fourth order).

Although the example of FIG. 1 is described with the system 100 enabling users to rideshare before the driver starts the transport service for the first user, as an addition or an alternative, the system 100 can also arrange ridesharing between multiple users after the driver has picked up the first user and is transporting the first user to the first destination location. For example, while the first user is being transported, the dispatch 110 can receive a request from the second user. The score compute 118 can determine distances by substituting the first user's pickup location with the current location of the transport service (e.g., the current location of the driver and/or the first user). The score compute 118 can perform similar computations as discussed above.

Still further, although examples describe only two users sharing a transport service, in other examples, three or more individual users can be arranged by the system 100 for sharing a transport service. For example, the score compute 118 can determine additional distance measurements between pickup locations and destinations for three users. The score compute 118 can determine similar ratios and perform comparison operations to thresholds to determine whether the driver that is driving two users already, for example, should be selected to provide transport service for a third user.

As an addition or an alternative, the system 100 can also determine, through use of the dispatch 110, respective prices that individual users that are sharing in a transport service is to pay. For example, the prices can vary depending on the regions that the first pickup location, the second pickup location, the first destination location, and/or the second destination location are located in. Prices can be locked in (e.g., price factors that multiply the default price of 1×, such as 2× or 2.5×) for the respective users based on one or more of the locations. Still further, in some examples, the prices can be proportion to the amount of time traveled individually by a user as compared to when the ride sharing occurred. In addition, the prices can also be determined based on a predictive estimated cost for the individual users, e.g., what the users would have individually paid on estimate if the users individually took transport services without ridesharing.

Methodology

Figure 3A:
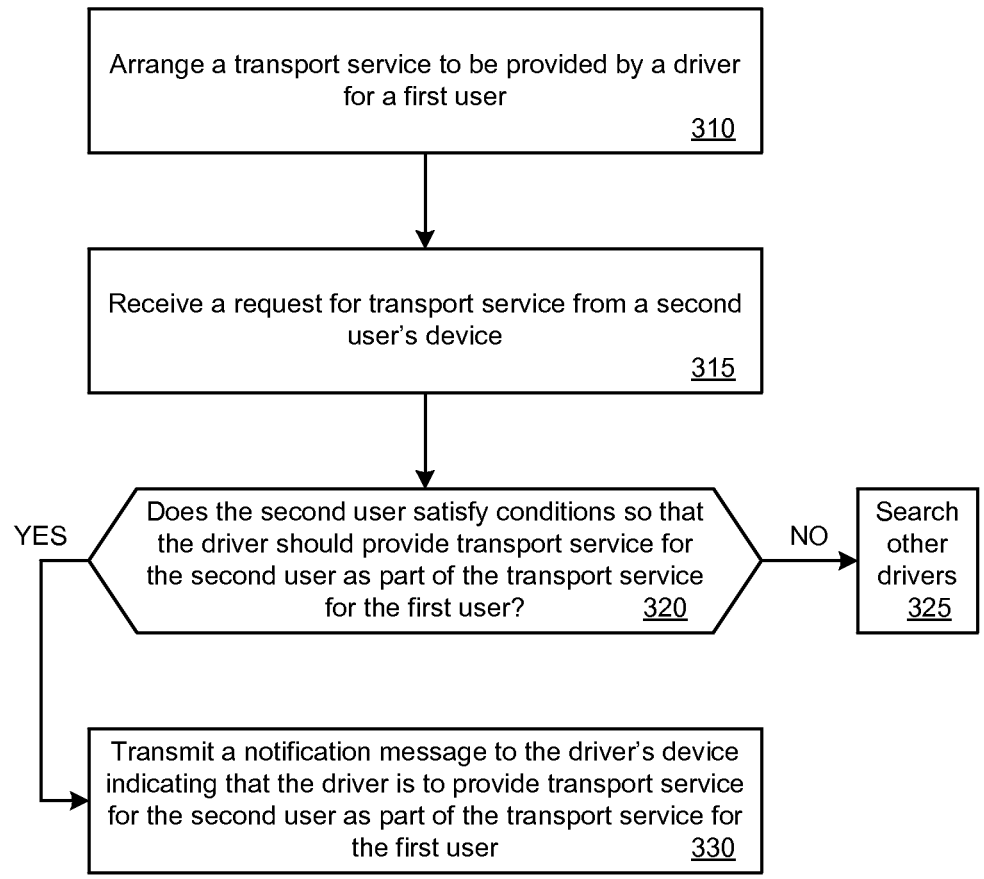
FIGS. 3A and 3B illustrate example methods for arranging a transport service for multiple users, according to embodiments.

FIG. 3A illustrates an example method for arranging a transport service for multiple users, under an embodiment. A method such as described by an embodiment of FIG. 3A can be implemented using, for example, components described with an embodiment of FIG. 1. Accordingly, references made to elements of FIG. 1 are for purposes of illustrating a suitable element or component for performing a step or sub-step being described.

Referring to FIG. 3A, the system 100 can arrange a transport service to be provided by a first driver for a first user (310). Subsequently, the system 100 can receive a request for transport service from a second user operating a second user's device (315). As discussed, in this example, both the first user and the second user has indicated and/or requested a transport service in which the transport service can be shared by another user. The system 100 can then determine whether the first driver transporting the first user and the second user satisfies conditions (in relation to the first driver) so that the first driver should provide transport service for the second user as part of the transport service already arranged for the first user (320). The system 100 can make this determination based, at least in part, on a first pickup location of the first user (or alternatively, a current location of the first driver), a second pickup location of the second user, a first destination location of the first user, and a second destination location of the second user.

If the system 100 determines that transporting the first user and the second user does not satisfy conditions and consequently, determines that the first driver should not provide transport service for the second user, the system 100 can search for additional or other drivers for the second user (325). For example, if there are no other drivers that have been arranged transport with other users and those users are willing to share the transport, the system 100 can select an available driver (that has not been arranged for a user, e.g., is unoccupied) to provide the transport service for the second user.

On the other hand, if the system 100 determines that transporting the first user and the second user satisfies conditions so that the first driver should provide transport service for the second user, the system 100 can transmit a notification message to the first driver's device to inform or invite the first driver to provide transport service for the second user as part of the transport service for the first user (330). According to an example, the system 100 can also transmit information that the driver application can use to display instructions as to the order in which to perform the transport service (along with information about the specified locations or addresses).

FIG. 3A is described with respect to a single driver of the first user and a request from a second user. Although not illustrated in FIG. 3A for purposes of simplicity, a plurality of drivers may be assigned to provide transport services for a plurality of users. Those drivers may be in a pool of arranged transport services that allow for ridesharing (e.g., can be in a pool of candidate drivers). Thus, when the system 100 receives a request for transport from a subsequent user (315), in one example, the system 100 can determine, by performing one or more initial filtering operations, a plurality of candidate drivers from the pool, and can determine whether any of those candidate drivers in the plurality are to be selected for the subsequent user, using the methods and operations described with respect to FIG. 1. If multiple drivers can be selected to provide transport service for the subsequent user, the driver select 112, for example, can select the driver that provides the least inconvenience for the subsequent user and a previous user that that driver is already arranged to provide transport for (e.g., pick the driver in which the previous user and/or the subsequent user has the lowest individual passenger cost or score.

Figure 3B:
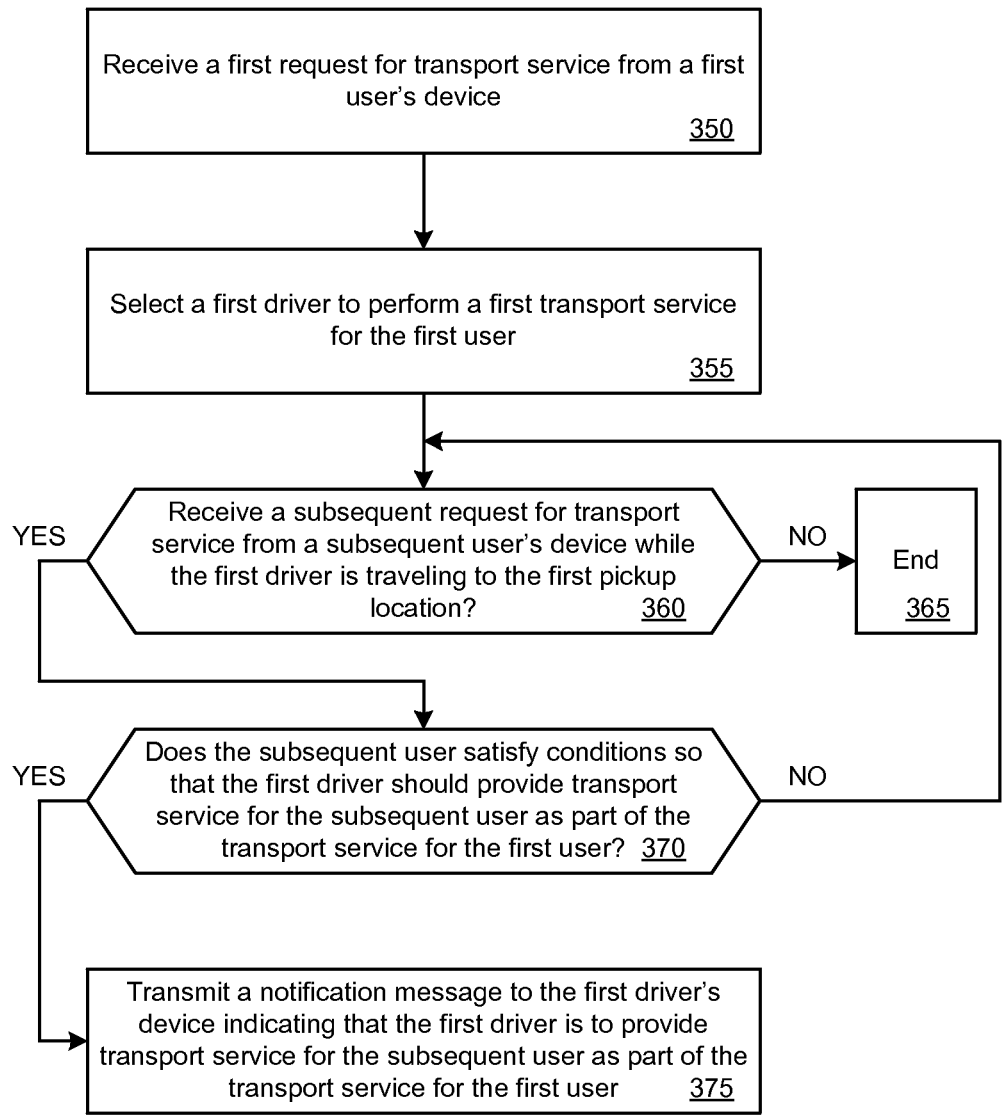

FIG. 3B illustrates another example method for arranging a transport service for multiple users, according to an embodiment. A method such as described by an embodiment of FIG. 3B can be implemented using, for example, components described with an embodiment of FIG. 1. Accordingly, references made to elements of FIG. 1 are for purposes of illustrating a suitable element or component for performing a step or sub-step being described.

For example, in FIG. 3B, the system 100 can receive a request for transport service from a first user's device (350). The system 100 can select a first driver to perform the first transport service for the first user based, at least in part, on the user's (e.g., first) pickup location and the first driver's current location (355). The system 100 can then determine whether it receives a subsequent request for transport service from a subsequent user's device, e.g., while the first driver is traveling to the first pickup location (360). Such a determination can be based on different geographic regions. For example, the system 100 can determine that no subsequent request is received from a subsequent user's device if that user's pickup location and/or destination location is more than a predefined distance away from the first user's pickup location and/or destination location or is not in the same geographic region or service area that the first user's pickup location and/or destination location is located in.

If the system 100 determines that no subsequent request is received from a subsequent user's device while the driver is traveling to the first pickup location, the system 100, the process ends (365) and the first driver can perform the transport service for the first user without having to pick up or provide a portion of the transport service for another user concurrently.

On the other hand, if the system 100 determines that a subsequent request has been received, the system 100 determines whether the subsequent user satisfies conditions (with respect to the first user's location information) so that the first driver should provide transport service for that subsequent user as part of the transport service for the first user (370). If the subsequent user does not satisfy the conditions (e.g., does not satisfy the first condition or satisfies the first condition but not the second condition), the method continues with the system 100 monitoring to determine if another subsequent request for transport service is received while the first driver is still traveling to the first pickup location.

If the second user satisfies conditions, the system 100 can transmit a notification message to the first driver's device to inform or invite the first driver to provide transport service for the second user as part of the transport service for the first user (375). As discussed, in one example, the system 100 can also transmit information that the driver application can use to display instructions as to the order (e.g., travel to Pick1 then Pick2 then Dest1 then Dest2) in which to perform the transport service (along with information about the specified locations or addresses).

Figure 4:
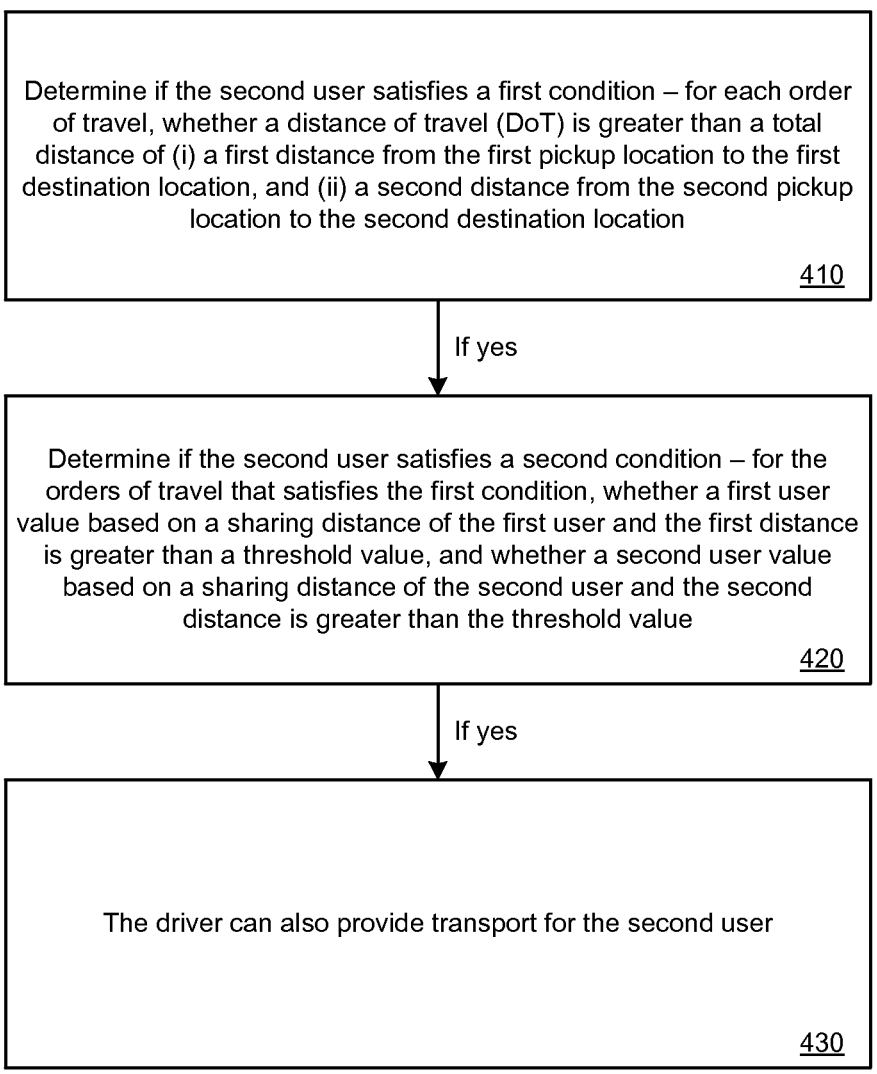
FIG. 4 illustrates an example method for determining whether a driver is to provide a transport service for a requesting second user, according to an embodiment.

FIG. 4 illustrates an example method for determining whether a driver is to provide a transport service for a requesting second user, according to an embodiment. A method such as described by an embodiment of FIG. 4 can be implemented using, for example, components described with an embodiment of FIG. 1. Accordingly, references made to elements of FIG. 1 are for purposes of illustrating a suitable element or component for performing a step or sub-step being described. In addition, reference is made to FIGS. 2A and 2B for simplicity.

In one example, FIG. 4 corresponds to step 320 of FIG. 3A and/or step 370 of FIG. 3B. The system 100 can determine if the second user satisfies a first condition with respect to a first user (or if the first user/first driver satisfies a first condition with respect to the second user) by determining, for each order of travel, whether the distance of travel (DoT) is greater than a total distance or sum of (i) a first distance from the first pickup location to the destination location (D1), and (ii) a second distance from the second pickup location to the second destination location (D2) (410). If any of the orders satisfies this condition, the second user, as a whole, can satisfy the first condition.

The system 100 can then determine if the second user satisfies a second condition by determining, for each order of travel that satisfies the previous condition, whether a first user value (based on a sharing distance of the first user (DS1) and the first distance (D1)) is greater than a threshold value, and whether a second user value (based on a sharing distance of the second user (DS2) and the second distance (D2)) is greater than the threshold value (420). If one or more of the orders satisfies these threshold conditions, the system 100 can determine that the driver driving the first user can provide the transport service for the second user (430).

The examples of FIGS. 3A through 4 are described from the perspective the system 100 already having selected and arranged a driver to provide transport service for a first user and then receiving a subsequent request from a second user, and from the perspective of performing computations for a single occupied driver with respect to the second user. However, in other examples, each time the system 100 receives a transport request the indicates ridesharing from a user, with a pickup and/or destination location in a given geographic region or service area, the system 100 can first determine a pool of drivers that have been arranged to provide arranged transport services that allow for ridesharing in the given region or service area. The system 100 can then perform the operations discussed in FIG. 4, for example, to determine if any of the drivers in the pool should be selected to provide transport for the requesting user. If there are five drivers in the pool, the system 100 can individually determine, for each of the five drivers, if the requesting user satisfies the first and/or second conditions with respect to the individual users' location information of those five drivers.

Figure 5A:
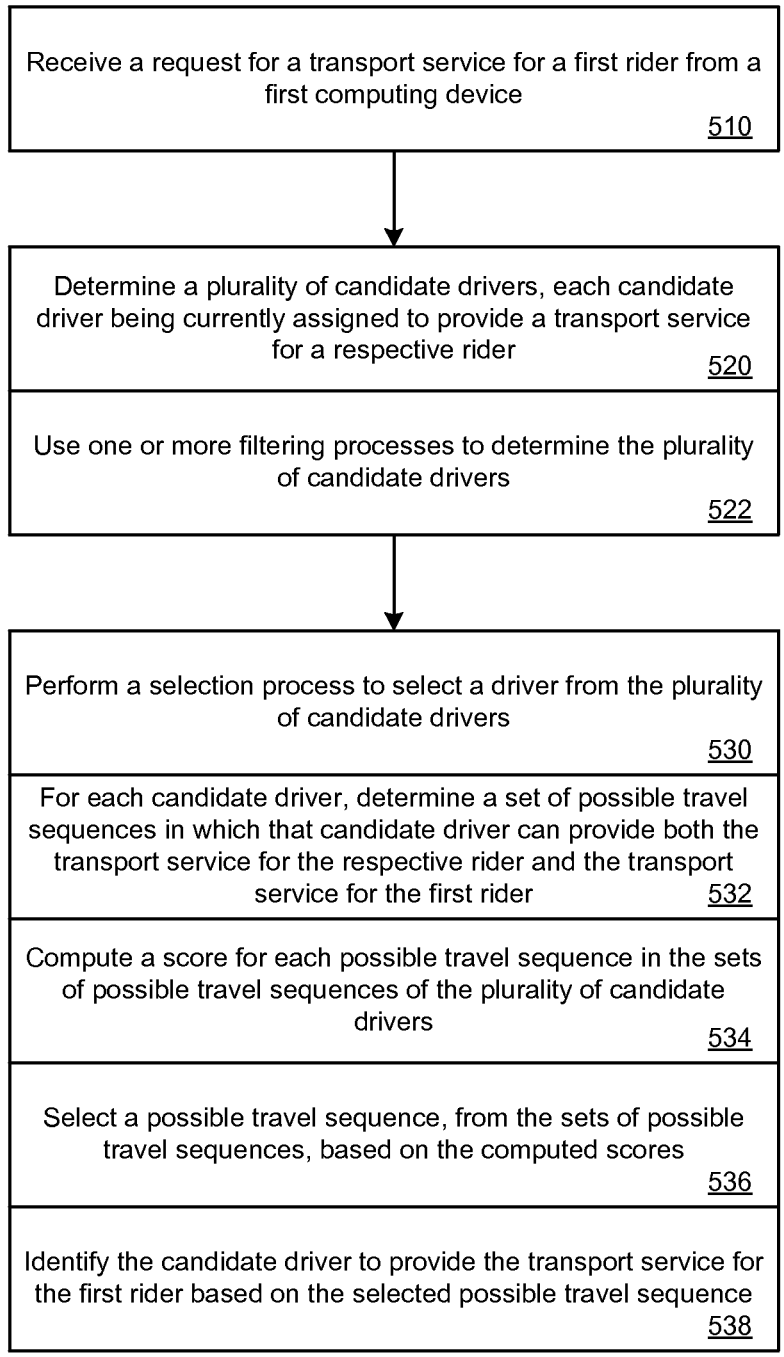
FIGS. 5A through 5C illustrate other examples methods for arranging a transport service for a user, in one embodiment.
Figure 5B:
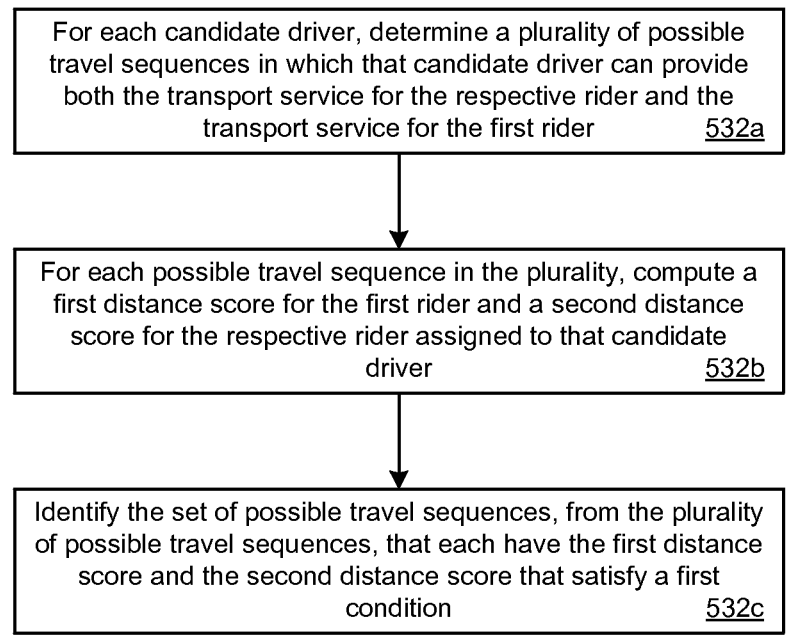
Figure 5C:
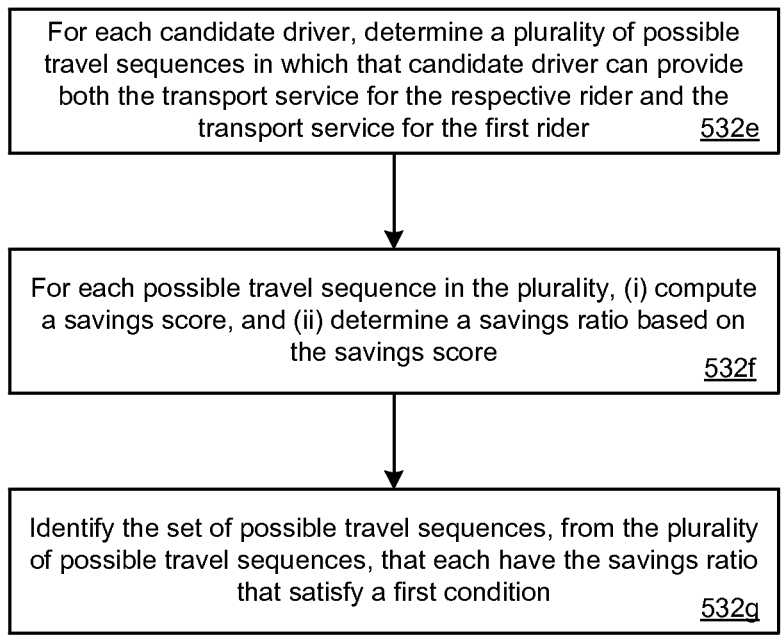

FIGS. 5A through 5C illustrate other examples methods for arranging a transport service for a user, in one embodiment. Methods such as described by embodiments of FIGS. 5A through 5C can be implemented using, for example, components described with an embodiment of FIG. 1. Accordingly, references made to elements of FIG. 1 are for purposes of illustrating a suitable element or component for performing a step or sub-step being described.

According to some examples, the dispatch 110 can receive a request for a transport service for a first rider from a first computing device over one or more networks (510). The first rider can operate a designated client application 181 on the first computing device to select a ridesharing vehicle type, for example, and to specify a first pickup location and a first destination location. The dispatch 110 can determine, based on the first pickup location and/or the first destination location, a plurality of candidate drivers (520). For illustrative purposes, in one example, each of the plurality of candidate drivers can be occupied drivers, e.g., those that are each currently assigned to provide a transport service for a respective user.

In some examples, the filter component 116 can use one or more filtering operations or processes to determine the plurality of candidate drivers (522). Depending on implementation, the filter component 116 can use a variety of one or more filtering operations or a combination of one or more filtering operations to determine the plurality of candidate drivers for the first user. According to one example, for the first rider (named Caleb), the filter component 116 can first determine a set of candidate drivers (e.g., Driver1, Driver2, Driver3, Driver5, Driver5) that can potentially provide the transport service for Caleb. The set can include those drivers that are (i) on-duty and using the driver application 191, (ii) providing the vehicle type corresponding to the rideshare option, (iii) assigned to provide a transport service for a respective rider (e.g., Rider1, Rider2, Rider3, Rider4, Rider5, respectively), and (iv) within a predetermined distance of the first pickup location of Caleb and/or within a predetermined ETA of the pickup location of Caleb.

According to an example, a first filtering operation can include, from the set of candidate drivers, determining the distance (or ETA) that each candidate driver in the set would travel to pick up both Caleb and the currently assigned respective rider, and then comparing the distance or ETA that each candidate driver would travel to a threshold distance or ETA. If the distance or ETA is greater than the threshold for a candidate driver, that candidate driver would be excluded from being potentially selected. A second filtering operation can include excluding those drivers, for example, that will be traveling (based on the currently assigned respectively rider), in an opposite direction or in an inefficient direction as compared to where those drivers would have to travel in order to provide transport service for Caleb. In one example, the second filtering operation can include performing dot product operations using vectors corresponding to the direction of travel for providing transport for the currently assigned respective rider and for providing transport for Caleb for the set of candidate drivers (or from a sub-set of candidate drivers if the second filtering operation is performed after the first filtering operation). As part of the second filtering operation, the filter component 116 can select those candidate drivers that are the best candidate drivers based on the direction of travel (e.g., the top X number of candidate drivers or the top Y %).

Still further, a third filtering operations can include computing, for each candidate driver in the set (or from a sub-set of candidate drivers after the first and/or the second filtering operations), the total distance (e.g., the Cartesian or Haversine distance, or the routed distance) or the total ETA of the total shared transport service that the first driver would have to travel to provide the transport service for both the first user and the second user. The third filtering operation can result in the filter component 116 excluding those candidate drivers that have a total distance that is greater than the individual distances of the first user and the second user, if those users would have been provided transport services individually and independently. Depending on implementation, the filtering operations can be performed in different orders and/or one or more of the individual filtering operations may be omitted by the filter component 116.

As a result of one or more filtering operations, the filter component 116 can determine the plurality of candidate drivers. In this example, the filter component 116 may have selected Driver2 and Driver3 as being the plurality of candidate drivers after performing the set of filtering operations. According to some examples, by performing an initial set of filtering operations, the system 100 can reduce the amount of computational resources used to perform the scoring determinations and computations for each of the plurality of candidate drivers, such as performed by the score compute 118. For example, the number of the set of candidate drivers can be much greater before the set of filtering operations are performed by the filter component 116 to reduce the total number of candidate drivers and the possible travel sequences of each candidate driver. This can result in consuming less power and saving computational resources during the additional selection process.

Once the plurality of candidate drivers are identified from the set (e.g., after the one or more filtering operations), the score compute 118 (and/or the driver select 112) can perform a selection process to select a driver from the plurality of candidate drivers to provide the transport service for Caleb (530). The selection process can vary based on implementation, e.g., as a result of different score computation processes, such as specified by an administrator of the system 100. In one example, the selection process can include, for each candidate driver in the plurality of candidate drivers, determining a set of possible travel sequences (or orders) in which that candidate driver can provide both the transport service for the respective rider and the transport service for the first rider by traveling to (i) the first pickup location of the first rider, (ii) the first destination location of the first rider, and (iii) a destination location of the respective rider.

Depending on implementation, the score compute 118 can determine the set of possible travel sequences for each candidate driver in the plurality of candidate drivers by reducing the total number of possible travel sequences. For example, depending on when the request for the transport service for the first rider is received, the total plurality of possible travel sequences can include a candidate driver traveling to the pickup location of the respective rider (e.g., if the candidate driver has not yet picked up the respective rider), or can include traveling from the current location of the candidate driver (e.g., if the candidate driver has picked up the respective rider). In other words, for a candidate driver, there can be four initial total possible travel sequences if that candidate driver has not yet picked up the respective rider (e.g., Pick1 to Pick2 to Dest1 to Dest2, Pick1 to Pick2 to Dest2 to Dest1, Pick2 to Pick1 to Dest1 to Dest2, or Pick2 to Pick1 to Dest2 to Dest1) or two initial total possible travel sequences if that candidate driver has already picked up the respective rider (e.g., Driver Location to Pick2 to Dest1 to Dest2, or Driver Location to Pick2 to Dest2 to Dest1). As a result, the number of initial total possible travel sequences can be based on the candidate driver's state when the request for the transport service is received from the first rider, Caleb. In examples described, the score compute 118 can determine the set of possible travel sequences (from a plurality of total possible travel sequences) in different ways.

The selection process can also include computing a score for each possible travel sequence in the sets of possible travel sequences of the plurality of candidate drivers (534). Depending on implementation, the score for each possible travel sequence in the sets can be based on distance or routed distance, or can be based on a combination of (i) distance or routed distance, (ii) time, and/or (iii) additional costs. The score compute 118 can select a possible travel sequence, from the set of possible travel sequences, based on the computed scores (536), and the driver select 112 can identify the candidate driver to provide the transport service for the first rider, from the plurality of candidate drivers, based on the selected possible travel sequence (538). In other words, based on the computed costs, one of the set of possible travel sequences can be determined to be the most efficient for the first rider, the respective rider, and/or the driver as a collective (e.g., by reducing the amount of time and/or distance the riders (and/or the driver) have to travel), while potentially maximizing cost savings for the riders.

As described herein, the score compute 118 can perform the selection process in different implementations, such as based on distance or routed distance, or based on a combination of (i) distance or routed distance, (ii) time, and/or (iii) additional costs. The latter can correspond to estimated travel costs for a user, such as, for example, an estimated cost for the transport service based on the distance traveled, the duration of time spent in the transport service, and/or other costs, such as tolls for bridges or turnpikes. In such an example, the price parameters (e.g., cost per distance, cost per time, cost for tolls), which effect the computed scores, can be based on the geographic region (or city or country) in which the riders are requesting transport services.

For example, the score compute 118 can perform the selection process based on distance or routed distance, such as described in FIG. 5B. FIG. 5B can correspond to step 532 of FIG. 5A, in one example. The score compute 118 can determine, for each candidate driver in the plurality of candidate drivers, the set of possible travel sequences by (i) determining a plurality of possible travel sequences in which that candidate driver can provide the shared transport service for the first rider and the respective rider, e.g., based on the state of that candidate driver (532*a*), (ii) for each of the plurality of possible travel sequences, computing a first distance score for the first rider, and a second distance score for the respective rider (532*b*), and (iii) identifying those possible travel sequences, that have the first distance score and the second distance score that each satisfy a first condition, as the set of possible travel sequences (532*c*). The first distance score for the first rider can be based, at least in part, on a shared distance in which the first rider and the respective rider would travel together and an individual distance in which the first rider would travel without the respective rider. The second distance score for the respective rider can be based, at least in part, on the shared distance and an individual distance in which the respective rider would travel without the first rider. For a possible travel sequence to be included in the set of possible travel sequences for each candidate driver, the first distance score and the second distance score would each have to satisfy a first condition (e.g., be greater than a rider savings threshold).

The score compute 118 can then compute the score for each possible travel sequence in the sets of possible travel sequences of the plurality of candidate drivers by (i) computing an original distance that that candidate driver would have traveled to provide the transport service for the respective rider assigned to that candidate driver, (ii) computing a projected distance that that candidate would travel for that possible travel sequence in the set, and (iii) computing the score based on the original distance the project distance. This score can correspond to the "driver cost," such as by subtracting the original distance from the projected distance. The score compute 118 can then select the possible travel sequence with the minimum or lowest driver cost, and select the candidate driver for that possible travel sequence.

Alternatively, the score compute 118 can perform the selection process based on a time and/or distance score, such as described in FIG. 5C. In one example, FIG. 5C can correspond to step 532 of FIG. 5A. The score compute 118 can determine, for each candidate driver in the plurality of candidate drivers, the set of possible travel sequences by (i) determining a plurality of possible travel sequences in which that candidate driver can provide the shared transport service for the first rider and the respective rider, e.g., based on the state of that candidate driver (532*e*), (ii) for each of the plurality of possible travel sequences, computing a savings score and/or a savings ratio based on the savings score (532*f*), and (iii) identifying those possible travel sequences, that have the savings score and/or a savings ratio that each satisfy a first score condition and/or a first ratio condition, respectively, as the set of possible travel sequences (532*g*). For each possible travel sequence in the plurality of possible travel sequences, the savings score can be based, at least in part, on a first predicted score of the first rider in which the first rider is transported individually, a second predicted score for the respective rider in which the respective rider is transported individually, and a third predicted score in which the first rider and the respective rider would travel together for at least a duration of the shared transport service or at least a duration of time. According to an example, for a possible travel sequence to be included in the set of possible travel sequences for each candidate driver, the savings ratio would each have to satisfy a first condition (e.g., be greater than a savings ratio threshold).

For example, for a possible travel sequence for a candidate driver, the first predicted score of the first rider, Caleb, can correspond to a score of 10 (such as a $10 estimated fare if Caleb was transported from the first pickup location to the first destination location individually), while the second predicted score of the respective rider of that candidate driver can correspond to a score of 15 (such as a $15 estimated fare if the respective rider was transported from the respective second pickup location to the respective second destination location. The third predicted score can be the estimated fare for the shared transport service if that candidate driver provided transport service for both Caleb and the respective rider, such as a score of 17 (e.g., $17 estimated fare). The savings score, for example, can be a score of 8 (e.g., $8 as a result of $25 total estimated fare subtracted by $17). The savings ratio can be 32% (e.g., the savings score divided by the sum of the first and second predicted scores). If the savings ratio of 32% is greater than the threshold savings ratio (e.g., 25%), then that possible travel sequence can be included in the set of possible travel sequences. In examples in which the predicted scores can correspond to estimated costs (e.g., based on rates of costs for distance and/or time and fees in a region), the predicted scores can include costs for tolls.

The score compute 118 can determine the savings score for each possible travel sequence in the sets of possible travel sequences, select the possible travel sequence with the highest savings score (or alternatively, the highest savings ratio), and select the candidate driver for that possible travel sequence.

Hardware Diagrams

Figure 6:
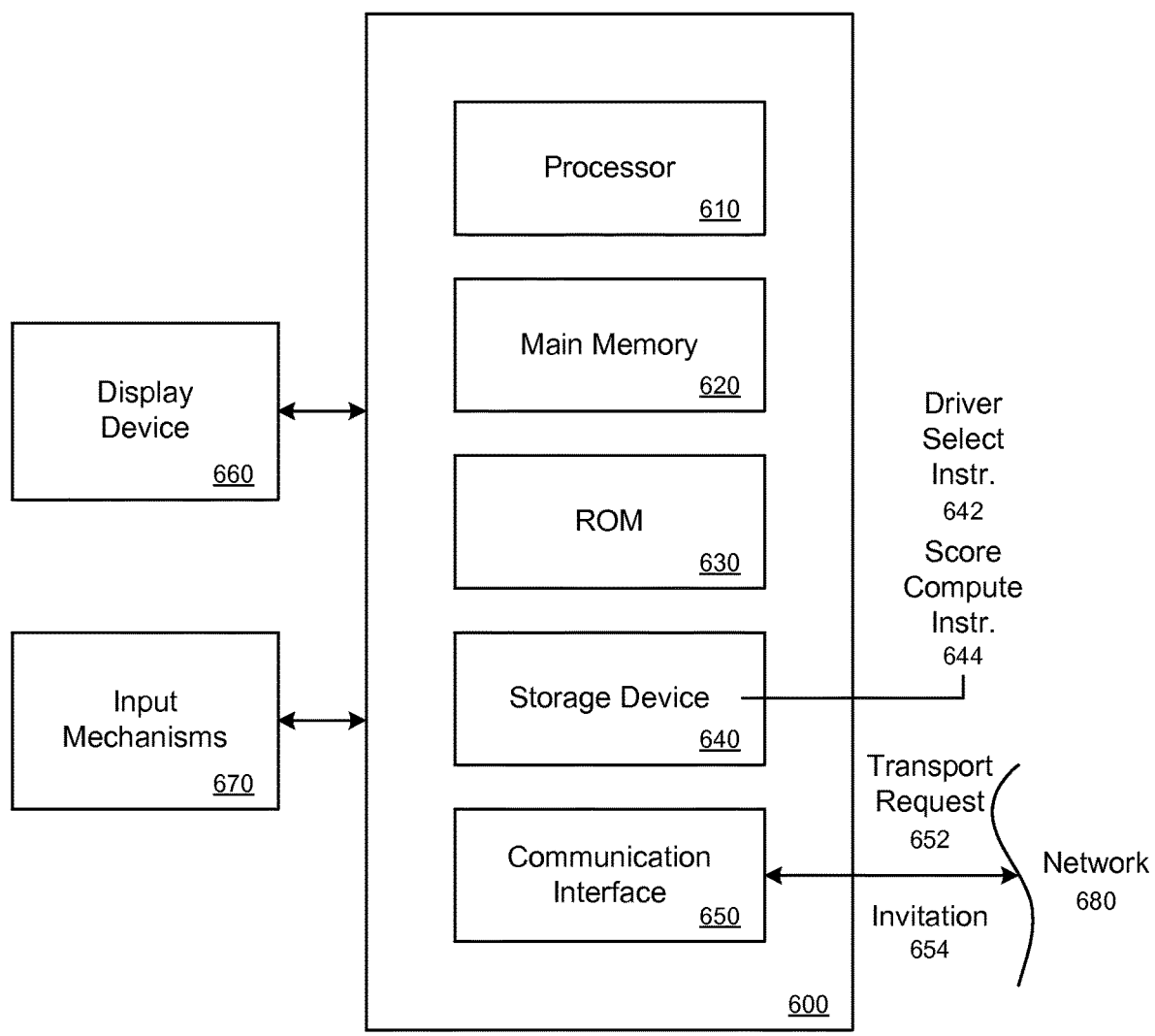
FIG. 6 is a block diagram that illustrates a computer system upon which embodiments described herein may be implemented.

FIG. 6 is a block diagram that illustrates a computer system upon which embodiments described herein may be implemented. For example, in the context of FIG. 1, the system 100 may be implemented using a computer system such as described by FIG. 6. The system 100 may also be implemented using a combination of multiple computer systems as described by FIG. 6.

In one implementation, a computer system 600 includes processing resources 610, a main memory 620, a read only memory (ROM) 630, a storage device 640, and a communication interface 650. The computer system 600 includes at least one processor 610 for processing information and the main memory 620, such as a random access memory (RAM) or other dynamic storage device, for storing information and instructions to be executed by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions, including driver select instructions 642 and score compute instructions 644.

For example, the processor 610 can execute the driver select instructions 642 to implement logic for selecting drivers for requesting users (with or without ridesharing requests specified), such as described in FIGS. 1 through 5C. The processor 610 can also execute the score compute instructions 644 to implement logic for determining or computing distance measurements based on multiple users' location information, such as described in FIGS. 1 through 5C.

The communication interface 650 can enable the computer system 600 to communicate with one or more networks 680 (e.g., cellular network) through use of the network link (wireless or wireline). Using the network link, the computer system 600 can communicate with one or more other computing devices and/or one or more other servers or datacenters. In some variations, the computer system 600 can receive a transport request 652 from a client device of a user via the network link. The transport request 652 can include the user's user ID, a requested pickup location data point, a destination location data point, and/or a vehicle type selection. The transport request 652 can also indicate that the user is open to sharing transport service with another user.

The processor 610, through execution of instructions, can select a driver from a pool of drivers that have been arranged to provide transport services that allow for ridesharing. As discussed, the processor 610, through execution of score compute instructions 644, can determine distances between locations for purposes of determining which driver should be assigned to the requesting user. The computer system 600 can then transmit an invitation 654 to the selected driver's device over the network link informing the driver about the transport service for the second user.

The computer system 600 can also include a display device 660, such as a cathode ray tube (CRT), an LCD monitor, or a television set, for example, for displaying graphics and information to a user. One or more input mechanisms 670, such as a keyboard that includes alpha-numeric keys and other keys, can be coupled to the computer system 600 for communicating information and command selections to the processor 610. Other non-limiting, illustrative examples of input mechanisms 670 include a mouse, a trackball, touch-sensitive screen, or cursor direction keys for communicating direction information and command selections to the processor 610 and for controlling cursor movement on the display 660.

Examples described herein are related to the use of the computer system 600 for implementing the techniques described herein. According to one embodiment, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

Figure 7:
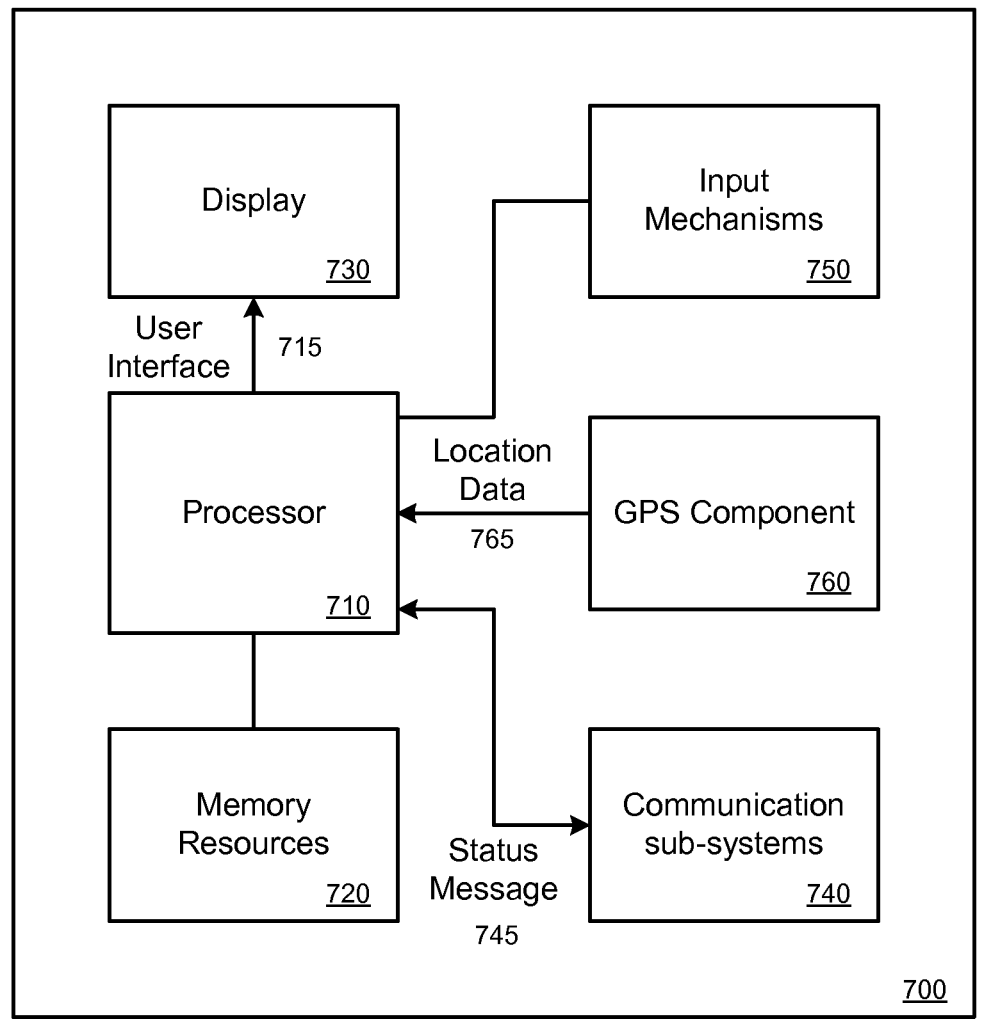
FIG. 7 is a block diagram that illustrates a mobile computing device upon which embodiments described herein may be implemented.

FIG. 7 is a block diagram that illustrates a mobile computing device upon which embodiments described herein may be implemented. In one embodiment, a computing device 700 may correspond to a mobile computing device, such as a cellular device that is capable of telephony, messaging, and data services. The computing device 700 can correspond to a client device or a driver device. Examples of such devices include smartphones, handsets or tablet devices for cellular carriers. The computing device 700 includes a processor 710, memory resources 720, a display device 730 (e.g., such as a touch-sensitive display device), one or more communication sub-systems 740 (including wireless communication sub-systems), input mechanisms 750 (e.g., an input mechanism can include or be part of the touch-sensitive display device), and one or more location detection mechanisms (e.g., GPS component) 770. In one example, at least one of the communication sub-systems 740 sends and receives cellular data over data channels and voice channels.

The processor 710 can provide a variety of content to the display 730 by executing instructions and/or applications that are stored in the memory resources 720. For example, the processor 710 is configured with software and/or other logic to perform one or more processes, steps, and other functions described with implementations, such as described by FIGS. 1 through 6, and elsewhere in the application. In particular, the processor 710 can execute instructions and data stored in the memory resources 720 in order to operate a client or driver service application, as described in FIGS. 1 through 6. Still further, the processor 710 can cause one or more user interfaces 715 to be displayed on the display 730, such as one or more user interfaces provided by the service application.

A user can operate a client device (such as the computing device 700) to operate the service application in order to make a request for a transport service. In one example, the computing device 700 can determine a location data point 765 of the current location and provide the location data point 765 to the transport arrangement system (not shown in FIG. 7). The transport arrangement system can receive the request and perform a driver selection process based on the request, such as whether the user wants to share a transport, whether there are any appropriate drivers for the user, etc. The transport arrangement system can transmit a status message 745 regarding the selection process. While FIG. 7 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A non-transitory computer-readable medium storing instructions that, when executed by one or more processors of a computing system, cause the computing system to provide an on-demand transport service by performing operations that include:

communicating, over one or more networks, with (i) computing devices of a plurality of drivers to determine a current location of each driver; and (ii) computing devices of a plurality of requesting riders of the on-demand transport service to receive a plurality of transport requests, each transport request of the plurality of transport requests identifying a pickup location and a destination location;

updating, by communicating with the computing devices of the plurality of drivers, a driver database that identifies a current location and a status of each driver of the plurality of drivers;

for each requesting rider of the plurality of requesting riders, selecting a driver from the plurality of drivers to provide transport by:
  accessing the driver database to determine a pool of candidate drivers, based on (i) the pickup location and the destination location of the transport request of the requesting rider, and (ii) the current location of individual drivers of the plurality of drivers, the pool of candidate drivers includes one or more drivers that are currently assigned to provide a transport service to another respective rider of the requesting riders;
  accessing the driver database to determine, for each candidate driver of the pool of candidate drivers, a set of travel sequences in which the candidate driver can provide the on-demand transport service for both the respective rider and the requesting rider by traveling from the current location of the candidate driver to each of (i) the pickup location and the destination location of the requesting rider, and (ii) the destination location of the respective rider;
  for each travel sequence in the set of travel sequences of each candidate driver of the pool of candidate drivers, executing scoring logic to generate a first score for the requesting rider and a second score for the respective rider currently assigned to the candidate driver, the first score being generated based on a shared distance in which the requesting rider and the respective rider would travel together and an individual distance in which the requesting rider would travel without the respective rider, the second score being generated based on the shared distance and an individual distance in which the respective rider would travel without the requesting rider;
  based on the first score and the second score for each travel sequence in the set of travel sequences for each of the pool of candidate drivers, selecting a travel sequence;
  selecting a driver from the pool of candidate drivers based on the selected travel sequence to transport the requesting rider to the destination location of the requesting rider; and
  transmitting, over the one or more networks, a transport invitation to a computing device of the selected driver to enable the selected driver to transport the requesting rider to the destination location of the requesting rider; and
  wherein selecting the travel sequence for each requesting rider is based at least in part on maximizing an amount of shared transport for the requesting rider and for the respective rider of the selected driver.

2. The non-transitory computer-readable medium of claim 1, wherein the executed instructions further cause the computing system to:
  for each travel sequence in the set of travel sequences, (i) computing a savings score based, at least in part, on a first predicted score of the first requesting rider in which the requesting rider is transported individually, a second predicted score for the respective rider in which the respective rider is transported individually, and a third predicted score in which the requesting rider and the respective rider would travel together for a duration of time, and (ii) determining a savings ratio based on the savings score.

3. The non-transitory computer-readable medium of claim 2, wherein the executed instructions cause the computing system to select the travel sequence by determining that the travel sequence has a highest savings score.

4. A computing system providing an on-demand transport service, the computing system comprising:
  a network communication interface to communicate, over one or more networks, with (i) mobile computing devices of drivers of an on-demand transport service, and (ii) computing devices of users of the on-demand transport service;
  one or more processors; and
  memory resources storing instructions that, when executed by the one or more processors, cause the computing system to:
  communicating, over one or more networks, with (i) computing devices of a plurality of drivers determine a current location of each driver;
  and (ii) computing devices of a plurality of requesting riders of the on-demand transport service to receive a plurality of transport requests, each transport request of the plurality of transport requests identifying a pickup location and a destination location;
  updating, by communicating with the computing devices of the plurality of driver, a driver database that identifies a current location and a status of each driver of the plurality of drivers;
  for each requesting rider of the plurality of requesting riders, selecting a driver from the plurality of drivers to provide transport by:
    accessing the driver database to determine a pool of candidate drivers, based on (i) the pickup location and the destination location of the transport request of the requesting rider, and (ii) the current location of individual drivers of the plurality of drivers, the pool of candidate drivers includes one or more drivers that are currently assigned to provide a transport service to another respective rider of the requesting riders;
    accessing the driver database to determine, for each candidate driver of the pool of candidate drivers, a set of travel sequences in which the candidate driver can provide the on-demand transport service for both the respective rider and the requesting rider by traveling from the current location of the candidate driver to each of (i) the pickup location and the destination location of the requesting rider, and (ii) the destination location of the respective rider;
    for each travel sequence in the set of travel sequences for of each candidate driver of the pool of candidate drivers, execute scoring logic to generate a first score for the requesting rider and a second score for the respective rider currently assigned to the candidate driver, the first score being based on a shared distance in which the requesting rider and the respective rider would travel together and an individual distance in which the requesting rider would travel without the respective rider, the second score being generated based on the shared distance and an individual distance in which the respective rider would travel without the requesting rider;
    based on the first score and the second score for each travel sequence in the set of travel sequences for each of the pool of candidate drivers, select a travel sequence;
    select a driver from the pool of candidate drives based on the selected travel to transport the requesting rider to the destination location of the requesting rider; and
    transmit, over the one or more networks, a transport invitation to a mobile computing device of the selected driver to enable the selected driver to transport the requesting rider to the destination location of the requesting rider; and wherein selecting the travel sequence for each requesting rider is based at least in part on maximizing an amount of shared transport for the requesting rider and for the respective rider of the selected driver.

5. The computing system of claim 4, wherein the executed instructions cause the computing system to further determine the set of travel sequences for each individual candidate driver in the plurality pool of candidate drivers based on a state of the individual candidate driver.

6. The computing system of claim 5, wherein the state corresponds to one of (i) a first state in which the individual candidate driver has not picked up the respective rider, or (ii) a second state in which the individual candidate driver has picked up the respective rider.

7. The computing system of claim 4, wherein the executed instructions cause the computing system to further generate the first score and the second score for each respective travel sequence in the set of travel sequences of each candidate driver of the pool of candidate drivers by:

computing (i) an original distance that the candidate driver would travel to provide the transport service for the respective rider currently assigned to the candidate driver, and (ii) a projected distance that the candidate driver would travel for the travel sequence.

8. The computing system of claim 7, wherein the executed instructions cause the computing system to compute the first score and the second score for each travel sequence in the set of travel sequences by subtracting the original distance from the projected distance; and wherein the executed instructions cause the computing system to select an optimal travel sequence by determining which of the travel sequences has the lowest score.

9. The computing system of claim 7, wherein the original distance and the projected distance are either (i) Cartesian or Haversine distances, or (ii) routed distances based on routes of travel.

10. The computing system of claim 4, wherein the first score and the second score for each travel sequence is further based on a combination of a distance measurement and a time measurement.

11. The computing system of claim 10, wherein the executed instructions further cause the computing system to:

for each travel sequence in the set of travel sequences, (i) compute a savings score based, at least in part, on a first predicted score of the first requesting rider in which the requesting rider is transported individually, a second predicted score for the respective rider in which the respective rider is transported individually, and a third predicted score in which the requesting rider and the respective rider would travel together for a duration of time, and (ii) determining a savings ratio based on the savings score.

12. The computing system of claim 11, wherein the executed instructions cause the computing system to select the travel sequence by determining that the travel sequence has a highest savings score of the set of travel sequences.

13. The computing system of claim 11, wherein the executed instructions cause the computing system to select the travel sequence by determining that the travel sequence a highest savings ratio of the set of travel sequences.

14. The computing system of claim 11, wherein the savings score accounts for any tolls for using a particular roadway, tunnel, or bridge.

15. A computer-implemented method of providing an on-demand transportation service, the method being performed by one or more processors of a computing system and comprising:

communicating, over one or more networks, with (i) computing devices of a plurality of drivers to determine a current location of each driver; and (ii) computing devices of a plurality of requesting riders to receive a plurality of transport requests, each transport request of the plurality of transport requests identifying a pickup location and a destination location;

updating, by communicating with the computing devices of the plurality of drivers, a driver database that identifies a current location and a status of each driver of the plurality of drivers;

for each requesting rider of the plurality of requesting riders, selecting a driver from the plurality of drivers to provide transport by:

accessing the driver database to determine a pool of candidate drivers, based on (i) the pickup location and the destination location of the transport request of the requesting rider, and (ii) the current location of individual drivers of the plurality of drivers, the pool of candidate drivers includes one or more drivers that are currently assigned to provide a transport service to another respective rider of the requesting riders;

accessing the driver database to determine, for each candidate driver of the pool of candidate drivers, a set of travel sequences in which the candidate driver can provide the on-demand transport service for both the respective rider and the requesting rider by traveling from the current location of the candidate driver to each of (i) the pickup location and the destination location of the requesting rider, and (ii) the destination location of the respective rider;

for each travel sequence in the set of travel sequences for of each candidate driver of the pool of candidate drivers, executing scoring logic to generate a first score for the requesting rider and a second score for the respective rider currently assigned to the candidate driver, the first score being generated based on a shared distance in which the requesting rider and the respective rider would travel together and an individual distance in which the requesting rider would travel without the respective rider, the second score being generated based on the shared distance and an individual distance in which the respective rider would travel without the requesting rider;

based on the first score and the second score for each travel sequence in the set of travel sequences for each of the pool of candidate drivers, selecting a travel sequence;

selecting a drive from the pool of candidate drivers based on selected travel sequence to transport the requesting rider to the destination location of the requesting rider; and transmitting, over the one or more networks, a transport invitation to a computing device of the selected candidate driver to enable the selected candidate driver to transport the first requesting rider to the destination location of the first requesting rider and wherein selecting the travel sequence for each requesting rider is based at least in part on maximizing an amount of shared transport for the requesting rider and for the respective rider of the selected driver.

16. The method of claim 15, further comprising:

for each travel sequence in the set of travel sequences, (i) computing a savings score based, at least in part, on a first predicted score of the first requesting rider in which the requesting rider is transported individually, a second predicted score for the respective rider in which the respective rider is transported individually, and a third predicted score in which the requesting rider and the respective rider would travel together for a duration of time, and (ii) determining a savings ratio based on the savings score.

17. The method of claim 16, wherein the computing system selects the optimal travel sequence by determining that the selected travel sequence has a highest savings score.

18. The method of claim 16, wherein the savings score accounts for any tolls for using a particular roadway, tunnel, or bridge.

19. The method of claim 15, wherein the executed instructions cause the computing system to further determine the set of travel sequences for each individual candidate driver in the pool of candidate drivers based on a state of the individual candidate driver.

20. The method of claim 19, wherein the state corresponds to one of (i) a first state in which the individual candidate driver has not picked up the respective rider, or (ii) a second state in which the individual candidate driver has picked up the respective rider.

* * * * *